United States Patent
Kimura

(10) Patent No.: US 7,177,089 B2
(45) Date of Patent: Feb. 13, 2007

(54) OBJECTIVE, OPTICAL PICKUP APPARATUS AND OPTICAL INFORMATION RECORDING AND/OR REPRODUCING APPARATUS

(75) Inventor: Tohru Kimura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/347,303

(22) Filed: Feb. 6, 2006

(65) Prior Publication Data

US 2006/0176578 A1 Aug. 10, 2006

(30) Foreign Application Priority Data

Feb. 10, 2005 (JP) ............................. 2005-034652

(51) Int. Cl.
G02B 21/02 (2006.01)
G02B 27/42 (2006.01)
G11B 7/20 (2006.01)

(52) U.S. Cl. .............. 359/661; 359/558; 369/112.07; 369/44.23; 369/94

(58) Field of Classification Search ........... 359/719, 359/661, 558, 562, 563; 369/112.07, 44.23, 369/94
See application file for complete search history.

(56) References Cited

U.S. PATENT DOCUMENTS 6,870,805 B1 * 3/2005 Arai et al. ............. 369/112.07

FOREIGN PATENT DOCUMENTS

JP 2004-265573 9/2004

* cited by examiner

*Primary Examiner*—Scott J. Sugarman
(74) *Attorney, Agent, or Firm*—Finnegan, Henderson, Farabow, Garrett & Dunner, L.L.P.

(57) ABSTRACT

An objective is used in an optical pickup apparatus which conducts reproducing and/or recording information for three different types of optical information recording media each having different thickness protective substrate by using three different wavelength light fluxes respectively. The objective comprises a first diffractive structure and in which the diffraction order for the maximum diffraction efficiency is the same for all of light fluxes, and a second diffractive structure that diffracts the second light flux without diffracting the first and third light fluxes.

36 Claims, 13 Drawing Sheets

LIGHT-CONVERGENT SPOT
OF THIRD LIGHT FLUX BY
FIRST DIFFRACTIVE STRUCTURE

FLARE COMPONENT PASSED
THROUGH AREA CORRESPONDING
TO OUTSIDE OF NUMERICAL
APERTURE NA3

LIGHT-CONVERGENT
SPOT OF THIRD LIGHT
FLUX BY FIRST
DIFFRACTIVE STRUCTURE

FLARE COMPONENT
PASSED THROUGH AREA
CORRESPONDING TO
OUTSIDE OF NUMERICAL
APERTURE NA3

OBJECTIVE, OPTICAL PICKUP APPARATUS AND OPTICAL INFORMATION RECORDING AND/OR REPRODUCING APPARATUS

BACKGROUND OF THE INVENTION

The present invention relates to an objective, an optical pickup apparatus and an optical information recording and/or reproducing apparatus.

In recent years, high density optical information recording media (which are also called optical discs) whose recording density has been improved by using a blue laser light source has been put to practical use. For the purpose of realizing simplification of the structure of an optical pickup apparatus, low cost and compactness, an objective having compatibility for a high density optical disc, DVD and CD is needed.

An objective that is used for an optical pickup apparatus having compatibility for the three types of optical information recording media stated above is disclosed in the following Document 1.

Document 1: TOKUKAI No. 2004-265573 (Japanese Published Patent Application No. 2004-265573)

The objective disclosed in numerical Example 2 of the aforesaid Document 1 has a diffractive structure that generates second order diffracted light for a blue laser light flux and generates first order diffracted light for an infrared laser light flux for CD and for a red laser light flux for DVD, and diffractive actions of the diffractive structure correct spherical aberration caused by a protective substrate thickness difference between a high density optical information recording medium and DVD, and correct spherical aberration caused by a protective substrate thickness difference between a high density optical information recording medium and CD by making a divergent light flux enter the objective for conducting recording and/or reproducing of information for CD.

However, this objective has the following two problems. One of them is one that the wavelength-dependency of the spherical aberration caused by the diffractive structure is high. In this case, a laser light source wherein an emission wavelength is deviated from the design wavelength cannot be used, and a laser light source needs to be selected, which increases manufacturing cost of the optical pickup apparatus. Since the spherical aberration grows greater in proportion to the fourth power of the numerical aperture, an influence of the wavelength-dependency of the spherical aberration for the diffractive structure is great, when the Blue-ray disc (BD) that uses an objective whose numerical aperture is 0.85. Another problem is that satisfactory recording and/or reproducing characteristics cannot be obtained for CD, because a degree of divergence of the infrared laser light source is too strong, and thereby, occurrence of coma in the case of tracking by the objective is too great, in the case of conducting recording and/or reproducing of information for CD.

An angle of diffraction of the diffracted light is expressed by "diffraction order×wavelength/diffraction pitch". For realizing compatibility between optical information recording media wherein a working wavelength is different each other, by utilizing diffractive actions, a prescribed difference needs to be given to the angle of diffraction. Both of the two problems mentioned above are caused by using the diffractive structures wherein values of "diffraction order×wavelength" are substantially the same between respective working wavelength for each optical information recording media.

In numerical Example 2 of the aforesaid Document 1, since "diffraction order×wavelength" ratio of blue laser light flux to red laser light flux is 810/650=1.25 which is close to 1 (wherein a unit of the wavelength is nm), the diffraction pitch needs to be small for obtaining a difference of necessary angle of diffraction for correcting spherical aberration caused by a protective substrate thickness difference between a high density optical information recording medium and DVD. Accordingly, the wavelength-dependency of spherical aberration of the diffractive structure grows greater, and "problem to select laser light source" becomes obvious. Further, since the degree of difficulty of processing a metal mold for the diffractive structure is enhanced, it becomes difficult to form an accurate diffractive structure.

On the other hand, since "diffraction order×wavelength" ratio of blue laser light flux to infrared laser light flux is 810/780=1.03, and an angle of diffraction of the blue laser light flux is substantially the same as that of infrared laser light flux, it is impossible to correct spherical aberration caused by a protective substrate thickness difference between a high density optical disc and CD, by using diffractive actions. Accordingly, for correcting spherical aberration caused by a protective substrate thickness difference between high density optical information recording medium and CD, magnification in the case of using high density optical information recording medium is required to be different from that in the case of using CD. As a result, "problem of tracking characteristics" becomes obvious.

In view of the problems mentioned above, the invention has been attained, and its objective is to provide an objective which can conduct properly spherical aberration correction necessary for attaining compatibility among high density optical disc, DVD and CD, without making a sacrifice of various characteristics such as wavelength-dependency of spherical aberration and tracking characteristics, an optical pickup apparatus employing the aforesaid objective and an optical information recording and/or reproducing apparatus in which the optical pickup apparatus is incorporated.

SUMMARY OF THE INVENTION

According to various embodiments, the present teachings can provide an optical pickup apparatus for recording and/or reproducing information for an optical information recording medium. The optical pickup apparatus can comprise a first light source, a second light source, a third light source and an objective.

The first light source can emit a first light flux having a wavelength $\lambda 1$ for recording and/or reproducing a first optical information recording medium comprising a first protective substrate whose thickness is t1.

The second light source can emit a second light flux having a wavelength $\lambda 2$ ($1.5 \times \lambda 1 < \lambda 2 < 1.7 \times \lambda 1$) for recording and/or reproducing a second optical information recording medium comprising a second protective substrate whose thickness is t2 (t1<=t2).

The third light source can emit a third light flux having a wavelength $\lambda 3$ ($1.9 \times \lambda 1 < \lambda 3 < 2.1 \times \lambda 1$) for recording and/or reproducing a third optical information recording medium comprising a third protective substrate whose thickness is t3 (t2<t3).

The objective can converge the first light flux emitted from the first light source onto an information recording plane of the first optical information recording medium when recording and/or reproducing information is conducted for the first optical information recording medium, can converge the second light flux emitted from the second light source onto an information recording plane of the second optical information recording medium when recording and/or reproducing information is conducted for the second optical information recording medium, and can converge the third light flux emitted from the third light source onto an information recording plane of the third optical information recording medium when recording and/or reproducing information is conducted for the third optical information recording medium.

The objective can comprise a first diffractive structure and a second diffractive structure.

The first diffractive structure can make a light amount of p-th ordered diffracted ray (p is an integer except 0) of the first light flux larger than a light amount of any other ordered diffracted ray of the first light flux, can make a light amount of p-th ordered diffracted ray of the second light flux larger than a light amount of any other ordered diffracted ray of the second light flux, and can make a light amount of p-th ordered diffracted ray of the third light flux larger than a light amount of any other ordered diffracted ray of the third light flux.

The second diffractive structure can make a light amount of 0-th ordered diffracted ray of the first light flux larger than a light amount of any other ordered diffracted ray of the first light flux, can make a light amount of q-th ordered diffracted ray (q is an integer except 0 and p=q or p≠q) of the second light flux larger than a light amount of any other ordered diffracted ray of the second light flux, and can make a light amount of 0-th ordered diffracted ray of the third light flux larger than a light amount of any other ordered diffracted ray of the third light flux.

Owing to the structure stated above, it is possible to obtain an objective which can conduct properly spherical aberration correction necessary for attaining compatibility among high density optical disc, DVD and CD, without making a sacrifice of various characteristics such as wavelength-dependency of spherical aberration and tracking characteristics, an optical pickup apparatus employing the aforesaid objective and an optical information recording and/or reproducing apparatus in which the optical pickup apparatus is installed.

DETAILED DESCRIPTION OF THE PREFERRED EMBODIMENT

Figure 1:
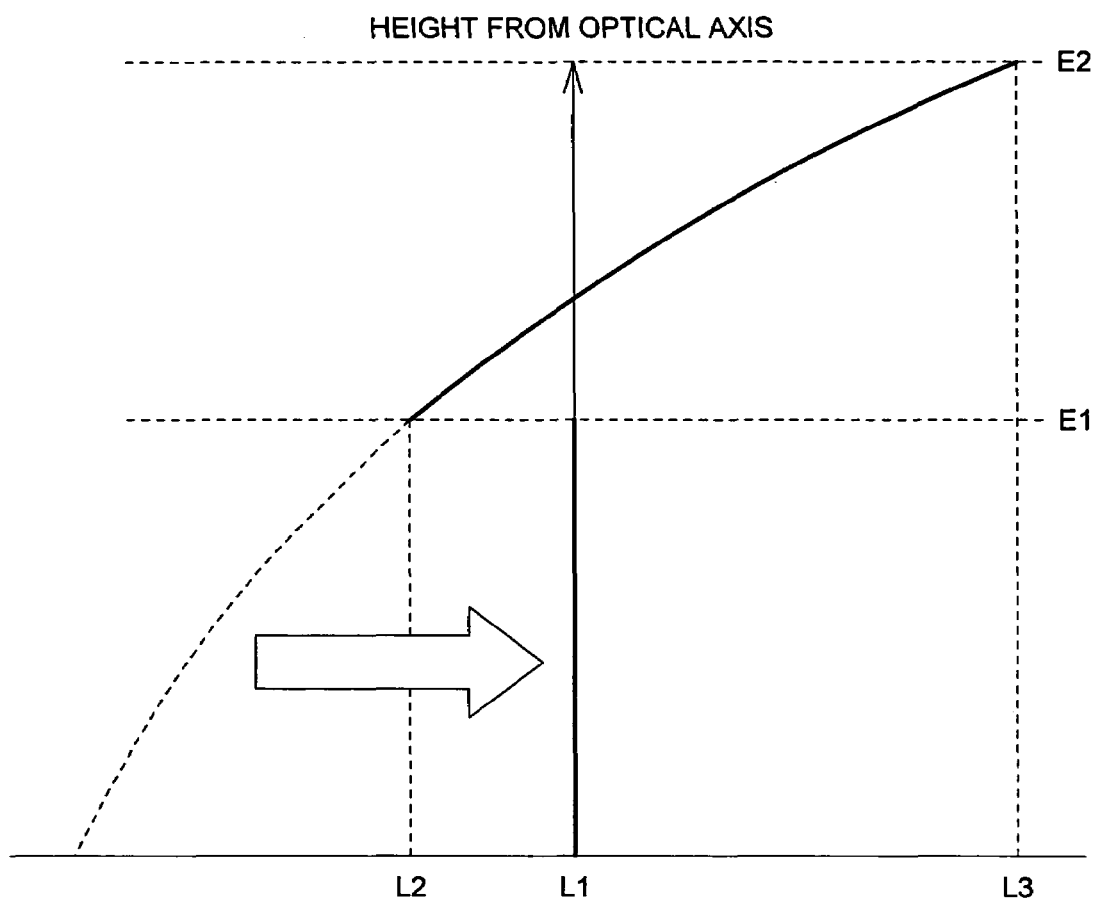
FIG. 1 is a vertical spherical aberration diagram of the third wavelength $\lambda 3$ according to certain embodiments.

A preferred first embodiment will be described below. In an objective used for an optical pickup apparatus that conducts reproducing and/or recording of information by using a first light flux with first wavelength $\lambda 1$ emitted from the first light source for the first optical information recording medium having t1-thick protective substrate, conducts reproducing and/or recording of information by using a second light flux with second wavelength $\lambda 2$ emitted from the second light source for the second optical information recording medium having t2-thick protective substrate (t1<t2), and conducts reproducing and/or recording of information by using a third light flux with third wavelength $\lambda 3$ ($1.9 \times \lambda 1 < \lambda 3 < 2.1 \times \lambda 1$) emitted from the third light source for the third optical information recording medium having t3-thick protective substrate (t2<t3), it is characterized that the first diffractive structure in which the diffraction order for the maximum diffraction efficiency is the same for all of the first light flux, the second light flux and the third light flux, and the second diffractive structure that diffracts the second light flux without diffracting the first and third light fluxes, are provided.

The first diffractive structure can correct spherical aberration caused by a protective substrate thickness difference between different optical information recording media. For example, if a diffractive structure in which the diffraction order for the maximum diffraction efficiency is the same for all of the first light flux, the second light flux and the third light flux is used as the first diffractive structure for correcting spherical aberration caused by a protective substrate thickness difference between the first optical information recording medium (for example, a high density optical information recording medium) and the third optical information recording medium (for example, CD) for which a ratio of working wavelengths is about 1:2, a ratio of "diffraction order×wavelength" of the first light flux (for example, a blue laser light source) to the third light flux (for example, an infrared laser light source) comes to a value that is farthest from 1, and a sufficiently large difference can be provided to the diffractive angles for the first light flux and the third light flux. As a result, spherical aberration caused by a protective substrate thickness difference between the first optical information recording medium and the third optical information recording medium can be corrected by the diffractive actions of the first diffractive structure, and tracking characteristics can be improved because magnification of the objective for the third optical information recording medium becomes smaller. It is further possible to form a diffractive structure accurately, because spherical aberration can be corrected with a pitch of ring-shaped zones which is relatively large.

Further, the second diffractive structure can correct spherical aberration caused by a protective substrate thickness difference between different optical information recording media and/or spherical aberration caused by a difference between working wavelengths. For example, if the diffractive structure that diffracts the second light flux (for example, a red laser light source) without diffracting the first and third light sources is used as the second diffractive structure for correcting spherical aberration caused by a protective substrate thickness difference between the first optical information recording medium and second optical information recording medium (for example, DVD), or spherical aberration caused by a working wavelength difference between the first optical information recording medium and second optical information recording medium, a difference of "diffraction order×wavelength" value between the first light flux and the second light flux can be made to be a maximum, because the diffraction order of the first light flux comes to zero. As a result, a diffraction pitch of the second diffractive structure can be made to be sufficiently large, and thereby, wavelength-dependency of spherical aberration can be improved. Incidentally, "without diffracting" mentioned here means that an amount of light of $0^{th}$ order light is greater than that of diffracted light of any other order.

Meanwhile, a high density optical information recording medium (a high density optical disc) in the present specification is supposed to include Blu-ray disc (BD) and HD DVD (HD) naturally, and also a magneto-optical disc, an optical disc having on its information recording surface a protective film whose thickness is several nm–several tens nm, and an optical disc having a protective substrate or a protective film whose thickness is zero. Further, in the present specification, DVD is a generic term of optical discs in a DVD system such as DVD-ROM, DVD-Video, DVD-Audio, DVD-RAM, DVD-R, DVD-RW, DVD+R and DVD+RW, while, CD is a generic term of optical discs in a CD system such as CD-ROM, CD-Audio, CD-Video, CD-R and CD-RW.

In the present specification, "an objective" means an optical system which is arranged at the position facing an optical information recording medium in an optical pickup apparatus, has a function to converge a light flux emitted from a light source on an information recording surface of the optical information recording medium, and can be moved at least in the optical axis direction by an actuator. The "objective" in the present specification may be a single lens, or may be composed of one lens group, or may be composed of two or more lens groups.

The preferred second embodiment is the objective in the first embodiment wherein the aforesaid same order is 1 in the objective of the first embodiment, and blaze wavelength $\lambda B$ of the first diffractive structure satisfies the following expression (1).

$$\lambda 1 < \lambda B < \lambda 3 \quad (1)$$

From the viewpoint of diffraction efficiency, it is preferable that a diffraction order of the diffracted light generated by the first diffractive structure is made to be 1 for any light flux, and the diffracted light is optimized (in other words, to be blazed) at a wavelength between the first wavelength $\lambda 1$ and the third wavelength $\lambda 3$. By changing the blaze wavelength $\lambda B$ of the first diffractive structure within a range of satisfying expression (1), in accordance with specifications of an optical pickup apparatus in which the objective of the invention is installed, it is possible to change properly a balance of diffraction efficiency for each wavelength. For example, in the case of the specification wherein the greater importance is attached to diffraction efficiency for the first light than to diffraction efficiency for the third light flux, it is preferable to set blaze wavelength $\lambda B$ to be closer to the first wavelength $\lambda 1$. On the other hand, in the case of the specification wherein the greater importance is attached to diffraction efficiency for the second light flux or the third light flux than to diffraction efficiency for the first light flux, it is preferable to set blaze wavelength $\lambda B$ to be closer to the third wavelength $\lambda 3$. In the present specification, "blaze wavelength $\lambda B$" means a wavelength in which a theoretical figure of the diffractive efficiency is 100%.

The preferred third embodiment is the objective in the second embodiment wherein, when NA1 represents a numerical aperture of the objective in the case of conducting reproducing and/or recording of information for the first optical information recording medium, and NA3 (NA1>NA3) represents a numerical aperture of the objective in the case of conducting reproducing and/or recording of information for the third optical information recording medium, the first diffractive structure is formed on an area corresponding to the inside of the numerical aperture NA3, and blaze wavelength $\lambda B$ of the first diffractive structure, the numerical aperture NA1 and the numerical aperture NA3 satisfy the following expressions (2) and (3).

$$1.25 \times \lambda 1 < \lambda B < 0.95 \times \lambda 2 \quad (2)$$

$$NA3/NA1 < 0.7 \quad (3)$$

When numerical aperture NA3 of the objective is sufficiently small for numerical aperture NA1 (namely, when the numerical aperture NA1 and the numerical aperture NA3 satisfy expression (3)), it is preferable that the first diffractive structure is formed on the area corresponding to the inside of the numerical aperture NA3. Owing to this, an area rate of the area where the first diffractive structure is formed to the effective diameter of the first wavelength $\lambda 1$ (an area corresponding to the inside of the numerical aperture NA3) becomes small, thereby, area-weighted average in the effective diameter of the diffraction efficiency of the first wavelength $\lambda 1$ can be secured to be sufficiently high even when the diffraction efficiency of the third wavelength $\lambda 3$ is enhanced to be high (namely, blaze wavelength $\lambda B$ satisfies expression (2)). If the blaze wavelength $\lambda B$ is greater than the lower limit of the expression (2), diffraction efficiency of the second wavelength $\lambda 2$ and that of the third wavelength $\lambda 3$ can be secured to be high enough, which makes it possible to improve characteristics of recording and/or reproducing for the second optical information recording medium and the third optical information recording medium. On the other hand, when blaze wavelength $\lambda B$ is smaller than the upper limit of expression (2), area-weighted average in the effective diameter of the diffraction efficiency of the first wavelength $\lambda 1$ can be made to be sufficiently high, thereby, it is possible to improve characteristics of recording and/or reproducing for the first optical information recording medium.

The preferred fourth embodiment is the objective in any one of the first embodiment–the third embodiment wherein, the diffractive power of the first diffractive structure is negative.

By making the diffractive power of the first diffractive structure to be negative, a space (a working distance) between an objective and a protective substrate can be secured sufficiently. Further, by making the diffractive power to be negative, it is possible to make an optical path difference function (an amount by which optical path difference added by the diffractive structure is expressed as function of height from the optical axis) to have an inflection point. If the optical path difference function has an inflection point, an inclination of the optical path difference function becomes small, whereby, a pitch of ring-shaped zones can be broadened, and accuracy of a form of the first diffractive structure can be improved. Incidentally, the diffractive power that is negative or positive means that the power of the flat optical element on which a diffractive structure is provided is negative or positive.

The preferred fifth embodiment is the objective in any one of the first embodiment–the fourth embodiment wherein, the first diffractive structure is characterized in that a cross-sectional form including an optical axis is stepwise.

If the first diffractive structure is made to be of the structure wherein a cross-sectional form including an optical axis is stepwise, processing of a metal mold is easy and accuracy of a form of the first diffractive structure can be improved.

The preferred sixth embodiment is the objective in any one of the first–fifth embodiments wherein, the second diffractive structure is of a structure in which patterns each having a stepwise sectional form including an optical axis are arranged to be in a form of concentric circles, and steps are shifted by a height equivalent to the number of steps corresponding to the number of level surfaces for a prescribed number of level surfaces, wherein an optical path difference added to the first light flux by one step in the aforesaid pattern is even multiples of the first wavelength $\lambda 1$. Meanwhile, the level surface mentioned in the present specification means a surface in the direction perpendicular to the optical axis among surfaces forming a stepwise form, and it is assumed to include also the uppermost and lowermost surfaces when counting the level surfaces. For example, in the case of the embodiment shown in FIG. 13, the number of level surfaces is 3. Further, one step in the pattern means dp in FIG. 13.

As a structure for obtaining a diffractive structure of a wavelength-selective type that diffracts only the second light flux, it is also possible to make the second diffractive structure to be a structure in which patterns each having a stepwise sectional form including an optical axis are arranged to be in a form of concentric circles, and steps are shifted by a height equivalent to the number of steps corresponding to the number of level surfaces for a prescribed number of level surfaces, and to make one step in the pattern to be even multiples of the first wavelength $\lambda 1$ in terms of an optical path difference.

The preferred seventh embodiment is the objective in the sixth embodiment wherein an optical path difference added to the first light flux by one step in the pattern (a step between adjoining level surfaces) is 1.9–2.1 times of the first wavelength $\lambda 1$, preferably is twice the first wavelength $\lambda 1$, and the prescribed number of level surfaces is any of 4, 5 and 6.

In the second diffractive structure, if one step in the pattern is made to be twice or about twice the first wavelength $\lambda 1$ in terms of an optical path difference, and the prescribed number of level surfaces formed in one pattern is made to be any of 4, 5 and 6, the diffraction efficiency of the second light flux can be secured to be higher. For making the diffraction efficiency of the second light flux to be maximum, it is most preferable to make the number of level surfaces to be 5.

The preferred eighth embodiment is the objective in the fourth embodiment wherein, when NA1 represents a numerical aperture of the objective in the case of conducting reproducing and/or recording of information for the first optical information recording medium, and NA3 (NA1>NA3) represents a numerical aperture of the objective in the case of conducting reproducing and/or recording of information for the third optical information recording medium, the first diffractive structure is formed on an area corresponding to the inside of the numerical aperture NA3, and the objective further has a third diffractive structure that diffracts the third light flux without diffracting the first and second light fluxes, on an area corresponding to the outside of the numerical aperture NA3.

The eighth embodiment relates to an aperture restriction for the third light flux. When diffractive power of the first diffractive structure is made to be negative, and its absolute value is made to be greater in order to secure working distance for reproducing and/or recording the third optical information recording medium, light-convergence position L1 for the third light flux that has passed through an area corresponding to the inside of numerical aperture NA3 is positioned between light-convergence position L2 for the third light flux that has passed through innermost periphery E1 of the area corresponding to the outside of the numerical aperture NA3 and light-convergence position L3 for the third light flux that has passed through outermost periphery E2 of the area corresponding to the outside of the numerical aperture NA3, as illustrated in vertical spherical aberration diagram in FIG. 1. Under this state, a light-convergence spot of the third light flux that has passed through an area corresponding to the inside of the numerical aperture NA3 may be covered by flare component that has passed through an area corresponding to the outside of the numerical aperture NA3, on the information recording surface of the third optical information recording medium, as shown schematically in FIG. 2, resulting in possibility that characteristics of recording and reproducing may be affected. By forming the third diffractive structure of a wavelength selective type that diffracts only the third light flux on an area corresponding to the outside of the numerical aperture NA3, it is possible to separate the light-convergence spot of the third light flux from flare components of the third light flux without affecting light-convergence characteristics of the first and second light fluxes. As a result, it is possible to make the objective to have a function of aperture restriction for the third light flux, and to improve more characteristics of recording and/or reproducing.

The ninth embodiment is the objective in the eighth embodiment wherein, the third diffractive structure is a two-step binary structure, and an optical path difference added to the first light flux by a step of the binary structure is 4.8–5.2 times of the first wavelength $\lambda 1$, preferably, 5 times the first wavelength $\lambda 1$.

Figure 3:
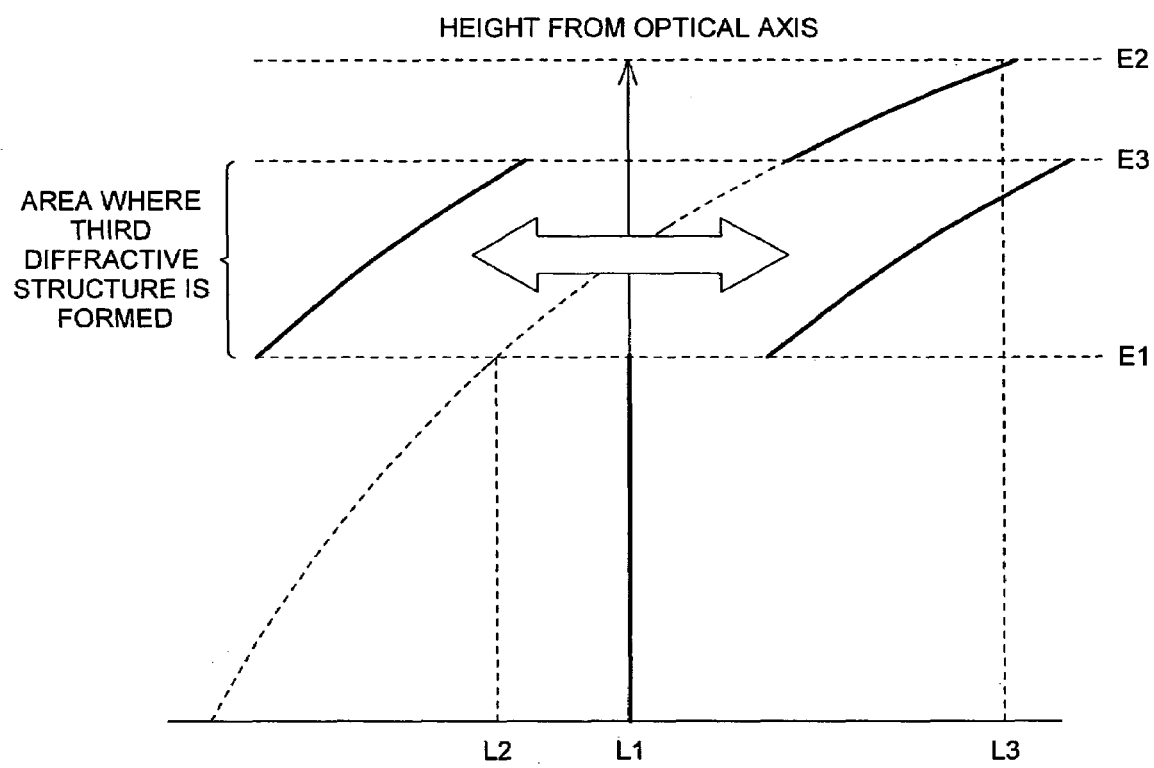
FIG. 3 is a vertical spherical aberration diagram of the third wavelength $\lambda 3$ according to certain embodiments.
Figure 4:
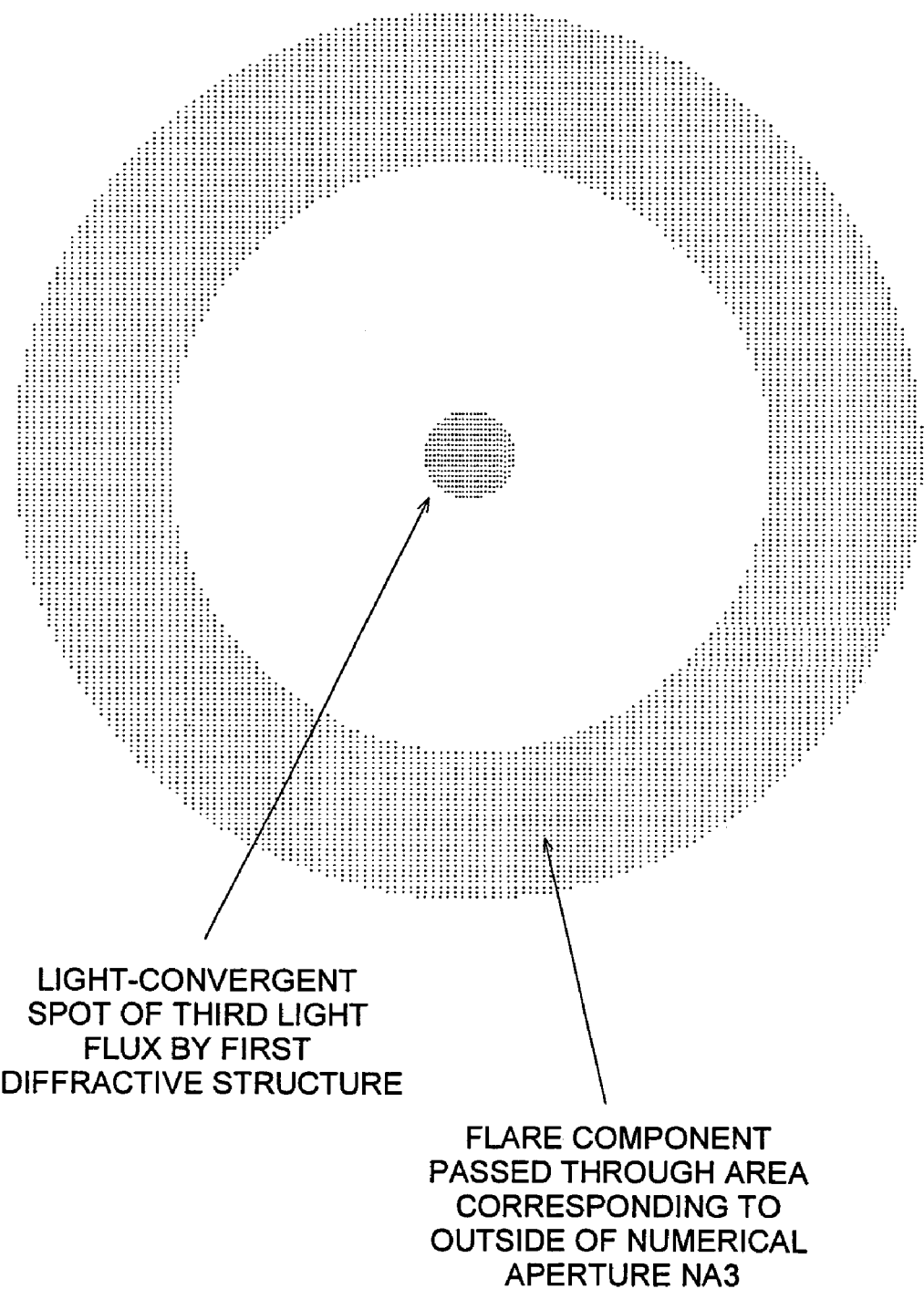
FIG. 4 is a spot diagram on an information recording surface of the third optical information recording medium according to certain embodiments.

When the third diffractive structure is made to be a two-step binary structure, and one step is made to be 5 times or about 5 times the first wavelength $\lambda 1$ in terms of an optical path difference, an optical path to be added to the second light flux by this step becomes 3 times or about 3 times the second wavelength $\lambda 2$, therefore, the first and third light fluxes are transmitted as they are without being subjected to diffracting actions. On the other hand, an optical path difference to be added to the third light flux by this step is 2.5 times or about 2.5 times the third wavelength $\lambda 3$, thus, most of an amount of the entered third light flux is allocated to $\pm 1^{st}$ order diffracted light, and diffracting characteristics of a wavelength-selective type which diffract only the third light flux can be given to the third diffractive structure. There will be explained a specific example to make the objective have a function to restrict an aperture for the third light flux, by using the third diffractive structure. In this example, the third diffractive structure is formed on a part of the area corresponding to the outside of numerical aperture NA3, and it is possible to separate a light-convergence spot of the third light flux from flare components of the third light flux as shown in FIG. 3 and FIG. 4, by optimizing a ring-shaped zone pitch of the third diffractive structure.

The preferred tenth embodiment is the objective in any one of the first–ninth embodiments wherein, when NA2 represents a numerical aperture of the objective in the case of conducting reproducing and/or recording of information for the second optical information recording medium, and NA3 (NA2>NA3) represents a numerical aperture of the objective in the case of conducting reproducing and/or recording of information for the third optical information recording medium, the first diffractive structure is formed on an area corresponding to the inside of the numerical aperture NA3, while, the second diffractive structure is formed on an area corresponding to the inside of the numerical aperture NA2 and the outside of the numerical aperture NA3.

The preferred eleventh embodiment is the objective in any one of the first–ninth embodiments wherein, when NA2 represents a numerical aperture of the objective in the case of conducting reproducing and/or recording of information for the second optical information recording medium, and NA3 (NA2>NA3) represents a numerical aperture of the objective in the case of conducting reproducing and/or recording of information for the third optical information recording medium, the first diffractive structure is formed on an area corresponding to the inside of the numerical aperture NA3, while, the second diffractive structure is formed on an area corresponding to the inside of the numerical aperture NA2.

There are considered two patterns for forming the second diffractive structure. One of them is an occasion to form the second diffractive structure on an area covering from numerical aperture NA3 to numerical aperture NA2 without forming on an area corresponding to the inside of numerical aperture NA3. In this case, spherical aberration in the area corresponding to the inside of numerical aperture NA3 needs to be corrected for all of the first, second and third light fluxes, but, it is difficult to correct simultaneously spherical aberrations of three light fluxes each having a different wavelength, by the first diffractive structure. It is therefore preferable to correct spherical aberration by making the magnification for one light flux among three light fluxes to be different from those of the other two light fluxes. Preferable ranges of specific magnifications are shown in the following expressions (4)–(6). In the expressions, each of M1 and f1 represent a magnification and a focal length of the objective in the case of using the first optical information recording medium, each of M2 and f2 represent a magnification and a focal length of the objective in the case of using the second optical information recording medium, and each of M3 and f3 represent a magnification and a focal length of the objective in the case of using the third optical information recording medium.

$$-0.02 < M1 \times f1 < 0.02 \quad (4)$$

$$-0.02 < M2 \times f2 < 0.02 \quad (5)$$

$$-0.05 < M3 \times f3 < -0.01 \quad (6)$$

Since it is possible to form the first diffractive structure and the second diffractive structure on the same optical surface, a decline of diffraction efficiency caused by form errors of ring-shaped zone pitch can be reduced more, compared with an occasion where the first diffractive structure and the second diffractive structure are formed respectively on different optical surfaces.

The other of the two patterns is an occasion to form the second diffractive structure on the entire surface of an area corresponding to the inside of numerical aperture NA2. Since the second diffractive structure has wavelength-selectivity to diffract only the second light flux, it is possible to control only light-convergence characteristics of the second light flux without affecting light-convergence characteristics of the first light flux and the third light flux. Therefore, when designing the first diffractive structure, aberrations of the first and third light fluxes only have to be noticed, and thereby, the ring-shaped zone pitch of the first diffractive structure can be determined so that various characteristics for the first and third light fluxes may be the best. Then, by determining the ring-shaped zone pitch of the second diffractive structure so that characteristics of the second light flux may be the best, it is possible to provide an objective having excellent characteristics for any light flux.

The preferred twelfth embodiment is the objective in the fourth embodiment wherein, when NA2 represents a numerical aperture of the objective in the case of conducting reproducing and/or recording of information for the second optical information recording medium, the second diffractive structure is formed on the entire surface of an area corresponding to the inside of the numerical aperture NA2, and diffractive power of the second diffractive structure is positive.

The twelfth embodiment relates to an aperture restriction for the second light flux. In the same way as in the explanation of the occasion of the third light flux concerning effects of the eighth embodiment, when diffractive power of the first diffractive structure is made to be negative, and its absolute value is made to be greater, light-convergence position L4 for the second light flux having passed through an area corresponding to the inside of numerical aperture NA2 is positioned between light-convergence position L5 for the second light flux that has passed through innermost periphery E4 of the area corresponding to the outside of the numerical aperture NA2 and light-convergence position L6 for the second light flux that has passed through outermost periphery E5 of the area corresponding to the outside of the numerical aperture NA2, as illustrated in vertical spherical aberration diagram in FIG. 5. Under this state, a light-convergence spot of the second light flux that has passed through an area corresponding to the inside of the numerical aperture NA2 may be covered by flare component that has passed through an area corresponding to the outside of the numerical aperture NA2, on the information recording surface of the second optical information recording medium, resulting in possibility that characteristics of recording and/or reproducing may be affected.

Figure 6:
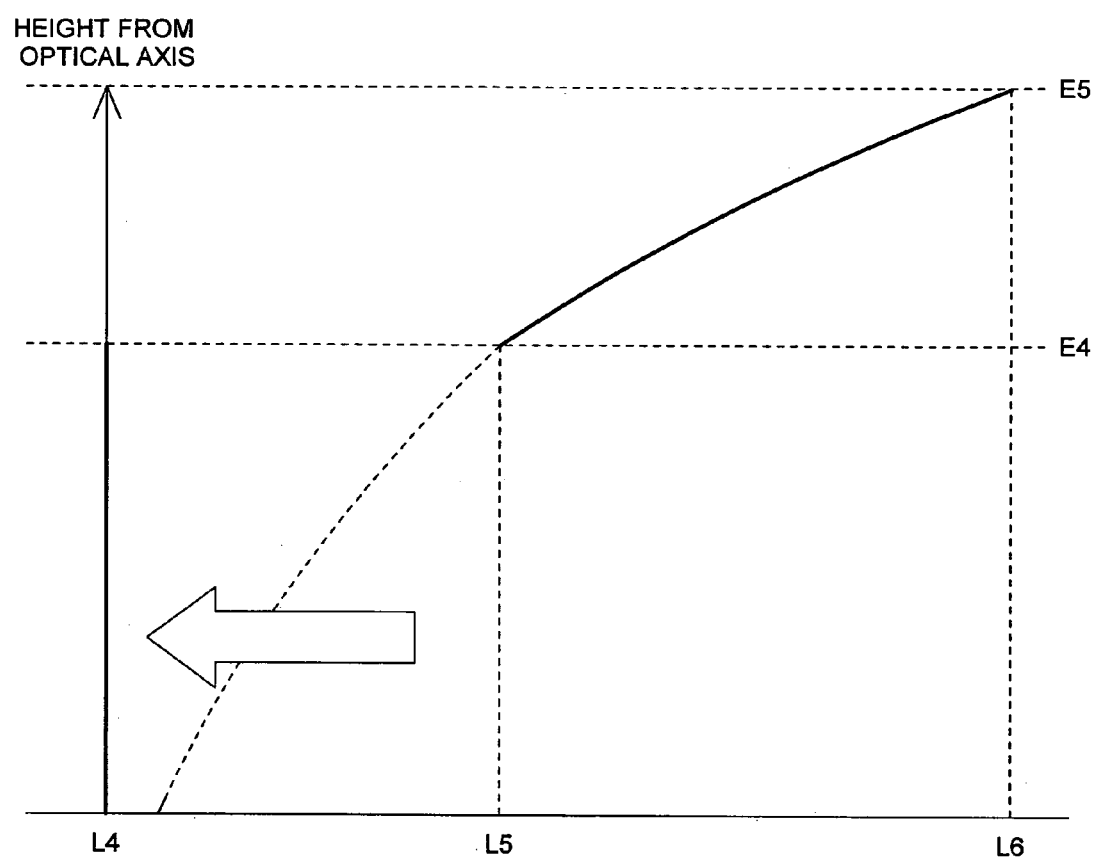
FIG. 6 is a vertical spherical aberration diagram of the second wavelength $\lambda 2$ according to certain embodiments.

In this case, for causing an objective to have a function of aperture restriction for the second light flux, there is considered a design wherein a diffractive structure of a wavelength-selective type that diffracts only the second light flux, on the area corresponding to the outside of the numerical aperture NA2, to separate a light-convergence spot of the second light flux from flare components of the second light flux having passed through an area corresponding to the inside of the numerical aperture NA2, in the same way as in the ninth embodiment. However, the diffractive structure of a wavelength-selective type that diffracts only the second light flux is easily affected by a decline of diffraction efficiency or by a decline of transmittance caused by errors of a form of the diffractive structure because the prescribed number of level surfaces formed in the pattern is many, and therefore, it is preferable to reduce an area where the diffractive structure is formed. Accordingly, as shown in the diagram of the vertical spherical aberration in FIG. 6, it is preferable to separate the light-convergence spot of the second light flux from flare components, by making the diffractive power of the second diffractive structure to be positive, and by moving the light-convergence position L4 to the position that is closer to the objective than the light-convergence position of the flare components having passed through the area corresponding to the outside of the numerical aperture NA2.

The preferred thirteenth embodiment is the objective in any one of the first–twelfth embodiments wherein, the objective further has a phase structure that adds the same amount of optical path difference respectively to the first light flux, the second light flux and the third light flux.

In the objective for a high density optical information recording medium, an amount of generation of aberration caused by perturbation such as temperature changes and changes in incident wavelength grows greater. Examples for them are spherical aberration caused by a refractive index change of a material resulting from temperature changes, spherical aberration caused by changes of incident wavelength and defocus caused by instantaneous change of incident wavelength. Therefore, if the phase structure having the function to restrain occurrence of the aberration is further provided on the objective, characteristics of recording and reproducing in the case of using a high density optical information recording medium can be improved. In this case, it is preferable to use a phase structure that adds the same amount of optical path difference to any one of the first, second and third light fluxes. Owing to this, even when forming the phase structure, it is possible to prevent that light-convergence characteristics of the first and second diffractive structures in the standard state for respective light fluxes are changed. Incidentally, "the standard state" mentioned here means the state that is free from the aforesaid perturbation, and it means specifically the state where a temperature is a design temperature, and a light flux having the design wavelength enters the objective.

The preferred fourteenth embodiment is the objective in the thirteenth embodiment wherein, the aforesaid same amount of optical path difference is 9.5–10.5 times, preferably, 10 times the first wavelength λ1 for the first light flux, while, it is 5.7–6.3 times, preferably, 6 times the second wavelength λ2 for the second light flux, and it is 4.8–5.2 times, preferably, 5 times the third wavelength λ3 for the third light flux.

With respect to the optical path difference added to each wavelength by the phase structure, it is preferable that it is 10 times or about 10 times the first wavelength λ1 for the first light flux, while, it is 6 times or about 6 times the second wavelength λ2 for the second light flux, and it is 5 times or about 5 times the third wavelength λ3 for the third light flux. For example, under the condition that the first wavelength λ1 is 405 nm, the second wavelength λ2 is 655 nm and the third wavelength λ3 is 785 nm, when calculating the optical path difference to be added to each light flux, it is 405×10=4050 nm for the first light flux, while, it is 655×6=3930 nm for the second light flux, and it is 785×5=3925 nm for the third light flux, which means that the optical path difference is approximately the same for each wavelength.

The preferred fifteenth embodiment is the objective in the thirteenth embodiment or the fourteenth embodiment wherein, the first diffractive structure and the aforesaid phase structure are formed on the same optical surface, and the prescribed number of ring-shaped zones of the first diffractive structure are formed in one ring-shaped zone of the phase structure.

By designing so that the prescribed number of ring-shaped zones of the first diffractive structure may be formed in one ring-shaped zone of the phase structure, both structures can be formed on the same optical surface without deteriorating the functions of the first diffractive structure and the phase structure. Owing to this, it is possible to make a decline of diffraction efficiency and a decline of transmittance both caused by errors in a form hardly influence, because the optical surface on which the diffractive structure and the phase structure are formed is reduced.

The preferred sixteenth embodiment is the objective in the fifteenth embodiment wherein, when m represents an integer, optical path difference $d_a$ to be added to the first light flux by the first diffractive structure, diffraction order p for which the diffraction efficiency for the first light flux is maximum in the first diffractive structure, optical path difference $d_1$ to be added to the first light flux by the phase structure, and diffraction order s for which the diffraction efficiency for the first light flux is maximum in the phase structure, satisfy the following expression (7).

$$|(d_a/p)/(d_1/s)|=m \qquad (7)$$

By designing the first diffractive structure and the phase structure so that a value m of expression (7) may be an integer, the prescribed number of ring-shaped zones of the first diffractive structure can be formed in one ring-shaped zone of the phase structure.

The preferred seventeenth embodiment is the objective in any one of the thirteenth embodiment–the sixteenth embodiment wherein, the phase structure is one in which a cross-sectional form including an optical axis is stepwise. When the phase structure is made to be of the structure in which a cross-sectional form including an optical axis is stepwise, processing of a metal mold is easy and accuracy of a form of the phase structure can be improved.

The preferred eighteenth embodiment is an optical pickup apparatus in which an objective in any one of the first–seventeenth embodiments is installed. In the eighteenth embodiment, it is possible to obtain an optical pickup apparatus having the same effect as that in any one of the first–seventeenth embodiments.

The preferred nineteenth embodiment is an optical information recording and/or reproducing apparatus in which an objective in any one of the first seventeenth embodiments is installed. In the nineteenth embodiment, it is possible to obtain an optical information recording and/or reproducing apparatus having the same effect as that in any one of the first–seventeenth embodiments.

The preferred twentieth embodiment will be described below. An objective used for an optical pickup apparatus conducting reproducing and/or recording of information by using the first light flux with the first wavelength λ1 emitted from the first light source for the first optical information recording medium having t1-thick protective substrate, conducting reproducing and/or recording of information by using the second light flux with the second wavelength λ2 (1.5×λ1<λ2<1.7×λ1) emitted from the second light source for the second optical information recording medium having t2-thick (t1<t2) protective substrate, and conducting reproducing and/or recording of information by using the third light flux with the third wavelength λ3 (1.9×λ1<λ3<2.1×λ1) emitted from the third light source for the third optical information recording medium having t3-thick (t2<t3) protective substrate, wherein the objective has the first diffractive structure and the second diffractive structure, and the first diffractive structure makes an amount of $p^{th}$ (p is an integer other than 0) order diffracted light of the first light flux to be greater than an amount of any other order diffracted light, then, makes an amount of $p^{th}$ order diffracted light of the second light flux to be greater than an amount of any other order diffracted light, and makes an amount of $p^{th}$ order diffracted light of the third light flux to be greater than an amount of any other order diffracted light, while the second diffractive structure makes an amount of $0^{th}$ order diffracted light of the first light flux to be greater than an amount of any other order diffracted light, then, makes an amount of $q^{th}$ (q is an integer other than 0 which is equal to or different from p) to be greater than an amount of any other order diffracted light and makes an amount of $0^{th}$ order diffracted light of the third light flux to be greater than an amount of any other order diffracted light. Incidentally, it is preferable that p is 1. Further, q is preferably 1.

Though it is preferable that a cross-sectional form including an optical axis of each of the first and second diffractive structures is stepwise, it may also be of a blaze type structure (serration type structure). Further, the first diffractive structure may also be of a structure in which patterns each having a stepwise sectional form including an optical axis are arranged to be in a form of concentric circles, and steps are shifted by a height equivalent to the number of steps corresponding to the number of level surfaces for a prescribed number of level surfaces.

In addition, the first diffractive structure and the second diffractive structure may be provided respectively on different optical surfaces of the objective, or they may be provided on the same optical surface. The first diffractive structure and the second diffractive structure may be superposed each other on the same optical surface, or they may not be superposed although they are provided on the same optical surface.

Meantime, the first diffractive structure and the second diffractive structure may be provided respectively on different optical surfaces facing each other of the same optical element included in the objective. Further, when the objective is viewed in the optical axis direction, an area where the first diffractive structure is provided and an area where the second diffractive structure is provided may be overlapped at least partially (or totally). Or, when the objective is viewed in the optical axis direction, an area where the first diffractive structure is provided and an area where the second diffractive structure is provided do not need to be overlapped completely.

The objective may have a plurality of optical elements. At least one of plural optical elements may be a flat optical element including the first diffractive structure and/or the second diffractive structure. At least one of plural optical elements may be either a convex lens or a concave lens, but, the convex lens is preferable. It is further preferable that a flat optical element has the first diffractive structure and the second diffractive structure. Further, it is preferable that the flat optical element has the third diffractive structure and/or a phase structure.

The preferred twenty-first embodiment will be described below. In the first embodiment or the twentieth embodiment, when NA2 represents a numerical aperture of an objective on the image side that is needed when conducting recording and/or reproducing with the second light flux for the second optical information recording medium, and NA3 represents a numerical aperture of an objective on the image side that is needed when conducting recording and/or reproducing with the third light flux for the third optical information recording medium, it is characterized that NA2 is greater than NA3, the first diffractive structure is formed on an area corresponding to the inside of NA3 and the second diffractive structure is formed on an area corresponding to the inside of NA2. The second diffractive structure may also be formed on an area that is within NA2 and is within NA3. In this case, if the first diffractive structure is formed on an area corresponding to the inside of NA3, an area where the first diffractive structure is formed is overlapped on an area where the second diffractive structure is formed, when the objective is viewed in the optical axis direction. Further, the second diffractive structure may also be formed on an area that is within NA2 and is out of NA3. In that case, if the first diffractive structure is formed on an area corresponding to the inside of NA3, an area where the first diffractive structure is formed is not overlapped on an area where the second diffractive structure is formed, when the objective is viewed in the optical axis direction. Further, the second diffractive structure may also be formed on the entire surface of an area corresponding to the inside of NA2. When the second diffractive structure is formed on the entire surface of an area corresponding to the inside of NA2, it is preferable that diffractive power of the second diffractive structure is positive.

As the preferred twenty-second embodiment, in the first embodiment or the twentieth embodiment, the second diffractive structure is of a structure in which patterns each having a stepwise sectional form including an optical axis are arranged to be in a form of concentric circles, and steps are shifted by a height equivalent to the number of steps corresponding to the number of level surfaces for a prescribed number of level surfaces, and the following expression (8) is satisfied.

$$y \times 0.95 \times \lambda1 \leq d_b \leq y \times 1.05 \times \lambda1 \qquad (8)$$

In the expression (8), y represents an optional even number and $d_b$ represents an optical path difference to be added to the first light flux by a step between adjoining level surfaces in the stepwise pattern. It is preferable that the number of level surfaces is any one of 4, 5 and 6. Further, y is preferably 2, and mote preferable is that the following expression (8)' is satisfied.

$$d_b = y \times \lambda1 \qquad (8)'$$

The preferred twenty-third embodiment is the first embodiment or the twentieth embodiment wherein the objective has a third diffractive structure. Meanwhile, the third diffractive structure is characterized to make an amount of $0^{th}$ diffracted light for the first light flux to be greater than that of any other orders, to make an amount of $0^{th}$ diffracted light for the second light flux to be greater than that of any other orders and to make an amount of $r^{th}$ (r is an integer other than 0 which is equal to or different from p) diffracted light for the third light flux to be greater than that of any other orders. Incidentally, r is preferably 1.

Further, the first diffractive structure and the third diffractive structure may be provided on the same optical surface of the objective. In that case, the first diffractive structure and the third diffractive structure may be provided to be superposed each other on the same optical surface. On the other hand, the second diffractive structure and the third diffractive structure may be provided on the same optical surface. In that case, the second diffractive structure and the third diffractive structure may be provided to be superposed each other on the same optical surface. Further, the third diffractive structure may be provided on the optical surface that is different from that for the first diffractive structure and the second diffractive structure.

The preferred twenty-fourth embodiment will be described below. In the twenty-third embodiment, when NA1 represents a numerical aperture of an objective on the image side that is needed when conducting recording and/or reproducing with the first light flux for the first optical information recording medium, and NA3 represents a numerical aperture of an objective on the image side that is needed when conducting recording and/or reproducing with the third light flux for the third optical information recording medium, it is characterized that NA1 is greater than NA3, the first diffractive structure is formed on an area corresponding to the inside of NA3 and the third diffractive structure is formed on an area corresponding to the outside of NA3.

The preferred twenty-fifth embodiment will be described below. In the twenty-third embodiment, the third diffractive structure is a two-step binary structure, and optical path difference $d_c$ to be added to the first light flux by on step of the binary structure satisfies the following expression (9).

$$4.8 \times \lambda 1 \leq d_c \leq 5.2 \times \lambda 1 \tag{9}$$

The preferred twenty-sixth embodiment will be described below. In the first embodiment or the twentieth embodiment, the objective has a phase structure, and satisfies the following expressions (10), (11), (12), (13) and (14).

$$a \times 0.95 \times \lambda 1 \leq d_1 \leq a \times 1.05 \times \lambda 1 \tag{10}$$

$$b \times 0.95 \times \lambda 2 \leq d_2 \leq b \times 1.05 \times \lambda 2 \tag{11}$$

$$c \times 0.95 \times \lambda 3 \leq d_3 \leq c \times 1.05 \times \lambda 3 \tag{12}$$

$$0.9 \times d_1 \leq d_2 \leq 1.1 \times d_1 \tag{13}$$

$$0.9 \times d_1 \leq d_3 < 1.1 \times d_1 \tag{14}$$

In the aforesaid expressions, a represents an optional positive integer, b represents an optional positive integer that is smaller than a and c represents an optional positive integer that is smaller than b. The $d_1$ represents an optical path difference of the first light flux generated by one step of the phase structure, $d_2$ represents an optical path difference of the second light flux generated by one step of the phase structure, and $d_3$ represents an optical path difference of the third light flux generated by one step of the phase structure. Meantime, when $\lambda 1$ is not less than 350 nm and is not more than 440 nm, $\lambda 2$ is not less than 570 nm and is not more than 670 nm, and $\lambda 3$ is not less than 750 nm and is not more than 880 nm, (more preferably, when $\lambda 1$ is not less than 390 nm and is not more than 415 nm, $\lambda 2$ is not less than 630 nm and is not more than 670 nm and $\lambda 3$ is not less than 750 nm and is not more than 820 nm), it is preferable that a is 10, b is 6 and c is 5. Or, it is preferable that a depth of one step of the phase structure in the optical axis direction is made to be not less than 3800 nm and not more than 4200 nm. It is further preferable that a depth of one step of the phase structure in the optical axis direction is a multiple of an integer, or an approximate multiple of the integer of the least common multiple of $\lambda 1$, $\lambda 2$ and $\lambda 3$.

Further, in the expressions (13) and (14), more preferable is to satisfy the following expressions (13)' and (14)'.

$$0.95 \times d_1 \leq d_2 \leq 1.05 \times d_1 \tag{13}'$$

$$0.95 \times d_1 \leq d_3 \leq 1.05 \times d_1 \tag{14}'$$

Though the phase structure in which a shape of cross section including an optical axis is stepwise is preferable, the phase structure may also be a blaze type structure (serration type structure). Incidentally, the first diffractive structure and the phase structure may be superposed each other on the same optical surface, or the second diffractive structure and the phase structure may be superposed each other on the same optical surface. Further, the third diffractive structure and the phase structure may be superposed each other on the same optical surface.

Further, when the phase structure makes an amount of $s^{th}$ (s is an integer other than 0) diffracted light of the first light flux to be greater than that of any other orders, then, makes an amount of $t^{th}$ (t is an integer other than 0 which is different from s) diffracted light of the second light flux to be greater than that of any other orders, and makes an amount of $u^{th}$ (u is an integer other than 0 which is different from s and t) diffracted light of the third light flux to be greater than that of any other orders, it is preferable that the following expression (15) is satisfied.

$$|(d_a/p)|/|(d_1/s)|=m \tag{15}$$

In the expression above, m represents a positive integer, $d_a$ represents an optical path difference to be added to the first light flux by the first diffractive structure and $d_1$ represents an optical path difference to be added to the first light flux by the phase structure.

The preferred twenty-seventh embodiment will be described below. In the twenty-sixth embodiment the first diffractive structure and the phase structure are provided on the same optical surface of the objective, and ring-shaped zones in prescribed number of the first diffractive structure are formed in one ring-shaped zone of the phase structure. In other words, in this embodiment, each of the phase structure and the first diffractive structure has a plurality of ring-shaped zones, and a width of the ring-shaped zone of the phase structure is greater than that of one ring-shaped zone of the first diffractive structure, thus, a plurality of ring-shaped zones of the first diffractive structure are included in one ring-shaped zone of the phase structure.

Figure 13:
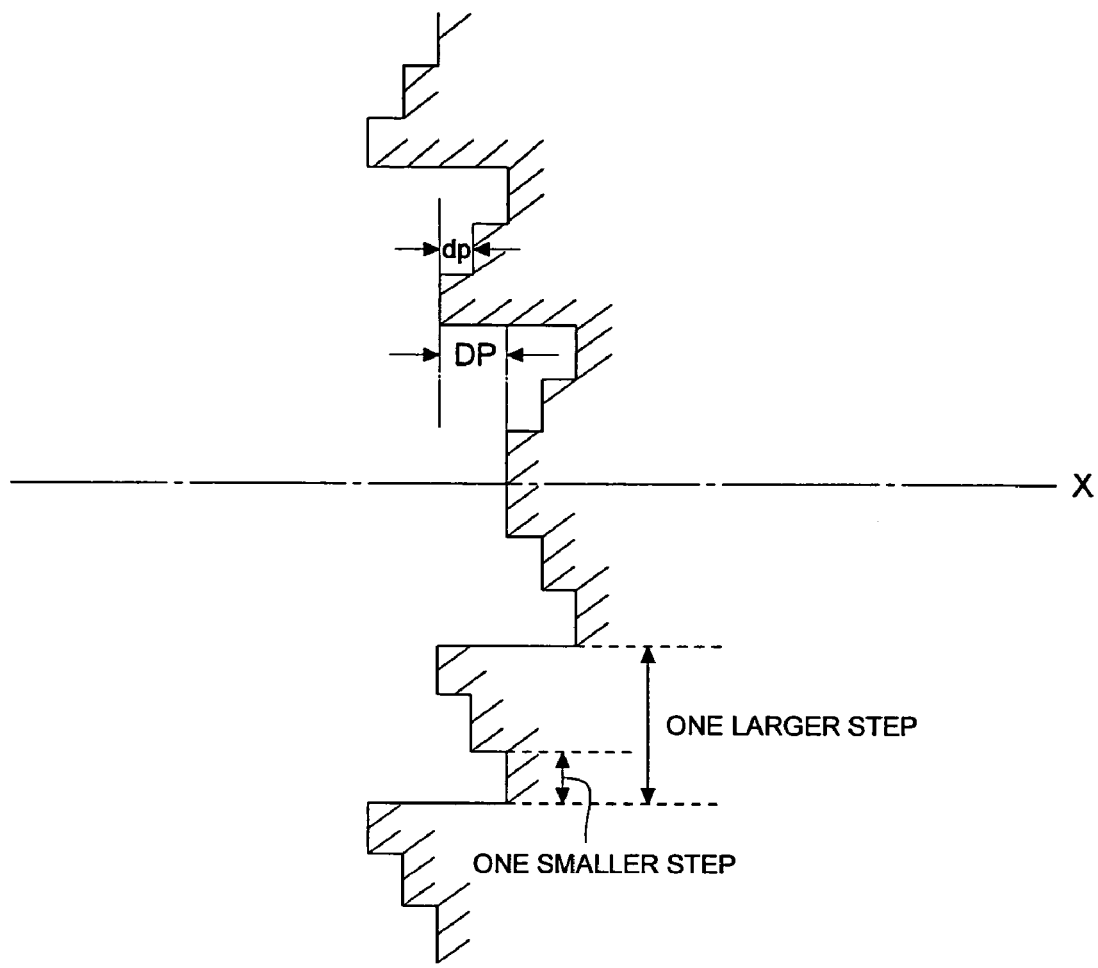
FIG. 13 is a drawing showing a part of the structure of an objective according to certain embodiments.

The preferred twenty-eighth embodiment will be described below. The objective is characterized to include the structure wherein a first form in which patterns in each of which a sectional form including an optical axis is made to be a stepwise form are arranged to be in a form of concentric circles is superposed on a second form in which patterns in each of which a sectional form including an optical axis is made to be a smaller stepwise form are arranged to be in a form of concentric circles in one step of the stepwise form of the first form. Further, as shown in FIG. 13, it is also possible to arrange so that a larger stepwise pattern composed of plural larger steps is in the structure wherein each step goes down in the direction toward the inside of the objective in the optical axis direction as that step advances toward the optical axis in the direction perpendicular to the optical axis direction, while, a smaller stepwise pattern composed of plural smaller steps is in the structure wherein each step goes up in the direction toward the outside of the objective in the optical axis direction as that step advances toward the optical axis in the direction perpendicular to the optical axis within a range of the larger step. The number of steps can be determined optionally for both the larger stepwise pattern and the smaller stepwise pattern. Further, each of the larger stepwise pattern and the smaller stepwise pattern may be either periodic or aperiodic.

When the larger stepwise pattern is superposed on the smaller stepwise pattern as shown in FIG. 13, it is preferable to satisfy the following expressions (16) and (17).

$$0.9 < dp \times (n-1)/\lambda 1 < 1.5 \tag{16}$$

$$9.8 < DP \times (n-1)/\lambda 1 < 10.2 \tag{17}$$

The dp represents a depth in the optical axis direction of the step of the smaller stepwise pattern shown in FIG. 13. DP represents a depth in the optical axis direction of the step of the larger stepwise pattern shown in FIG. 13. The n represents a refractive index of optical material of the objective on which a stepwise pattern is provided, for the first light flux.

It is further preferable that the second diffractive structure satisfies the following expression (18).

$$1.9 < dp_2 \times (n_x - 1)/\lambda 1 < 2.1 \qquad (18)$$

The $dp_2$ represents a depth in the optical axis direction of the step of the second diffractive structure. The $n_x$ represents a refractive index of optical material on which the second diffractive structure is provided, for the first light flux.

The preferred twenty-ninth embodiment is an optical pickup apparatus that comprises the first light source emitting the first light flux with wavelength $\lambda 1$ for conducting recording and/or reproducing for the first optical information recording medium having a t1-thick protective substrate, the second light source emitting the second light flux with wavelength $\lambda 2$ ($1.5 \times \lambda 1 < \lambda 2 < 1.7 \times \lambda 1$) for conducting recording and/or reproducing for the second optical information recording medium having a t2 (t1<t2)-thick protective substrate, the third light source emitting the third light flux with wavelength $\lambda 3$ ($1.9 \times \lambda 1 < \lambda 3 < 2.1 \times \lambda 1$) for conducting recording and/or reproducing for the third optical information recording medium having a t3 (t2≦t3)-thick protective substrate, and any objective in twentieth–twenty-eighth embodiments.

The preferred thirtieth embodiment is an optical information recording and/or reproducing apparatus that is equipped with an optical pickup apparatus of twenty-ninth embodiment.

EXAMPLE 1

The first embodiment of the invention will be explained as follows, referring to the drawings. First, an optical pickup apparatus employing an objective representing an example of the invention will be explained, referring to FIG. 7.

Figure 7:
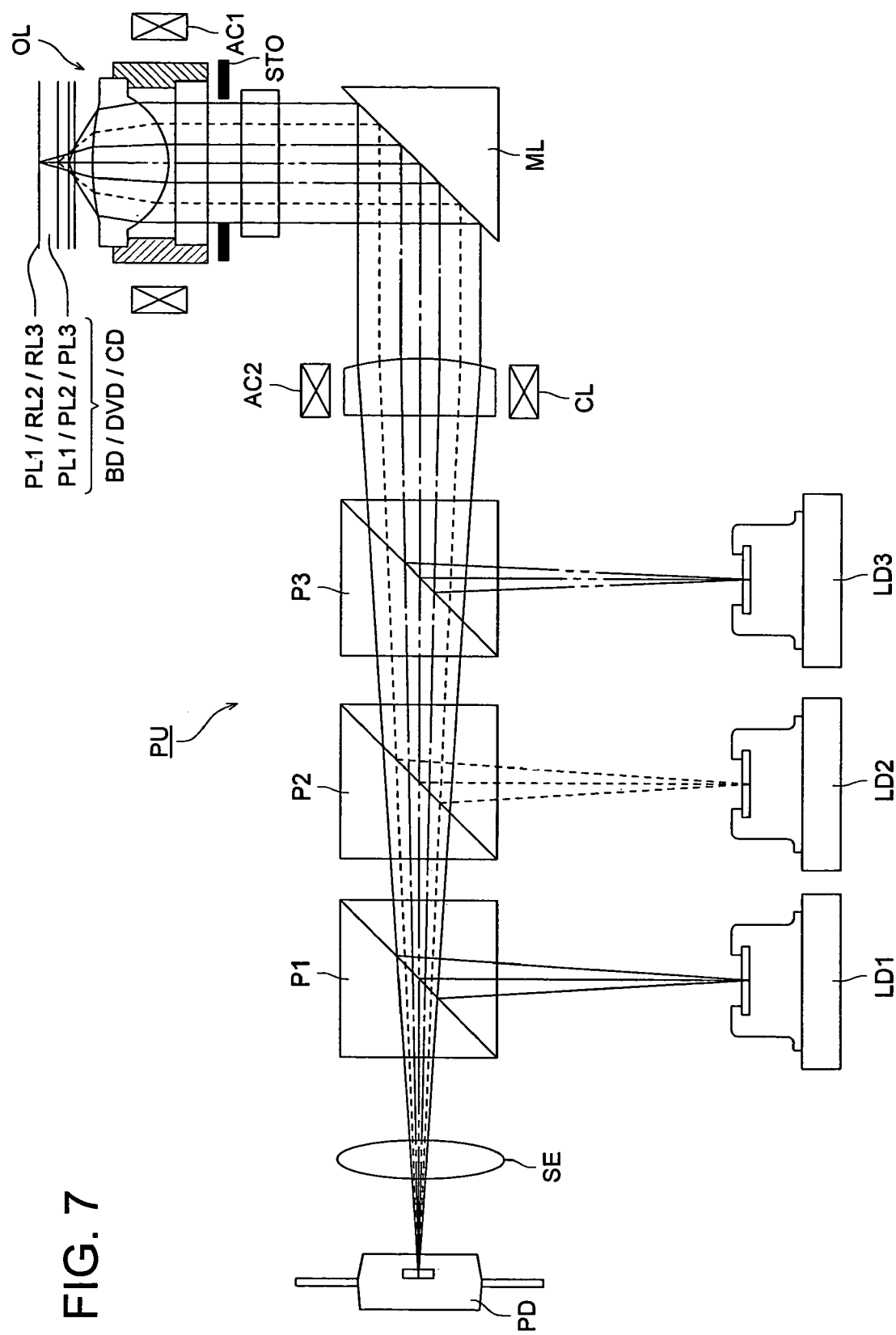
FIG. 7 is a plan view of primary portions showing the structure of an optical pickup apparatus according to certain embodiments.

FIG. 7 is a diagram showing schematically the structure of optical pickup apparatus PU that can conduct recording and/or reproducing of information for any of high density optical information recording medium BD (first optical information recording medium), DVD (second optical information recording medium) and CD (third optical information recording medium). Specifications of BD include first wavelength $\lambda 1$=405 nm, protective substrate PL1 thickness t1=0.1 mm, and numerical aperture NA1=0.85, specifications of DVD include second wavelength $\lambda 2$=655 nm, protective substrate PL2 thickness t2=0.6 mm, and numerical aperture NA2=0.65, and specifications of CD include third wavelength $\lambda 3$=785 nm, protective substrate PL3 thickness t3=1.2 mm, and numerical aperture NA3=0.51. However, a combination of the wavelength, the thickness of a protective substrate and the numerical aperture is not limited to the foregoing.

The optical pickup apparatus PU is composed of blue semiconductor laser LD1 (first light source) for BD, red semiconductor laser LD2 (second light source) for DVD, infrared semiconductor laser LD3 (third light source) for CD, photodetector PD for common use for BD, DVD and CD, objective OL, collimating optical system CL, biaxial actuator AC1, uniaxial actuator AC2, first prism P1, second prism P2, third prism P3, lifting mirror ML and of sensor optical system SE for adding astigmatism to reflected light flux coming from an information recording surface of each optical information recording medium. Meantime, as a light source for BD, blue SHG laser may also be used.

In the optical pickup apparatus PU, when conducting recording and/or reproducing of information for BD, a position of the collimating optical system CL is adjusted in the optical axis direction by uniaxial actuator AC2 so that a blue laser light flux may emerge from the collimating optical system CL in a state of a parallel light flux, and then, the blue semiconductor laser LD1 is caused to emit light. A divergent light flux emitted from the blue semiconductor laser LD1 is reflected by the first prism P1 as its light path is drawn with solid lines in FIG. 7, and then, is transmitted through second prism P2 and third prism P3 in succession, to be converted into a parallel light flux by the collimator optical system CL. After that, the parallel light flux is reflected by the lifting mirror ML, and is regulated by diaphragm STO in terms of a light flux diameter and becomes a spot formed by the objective OL on information recording surface RL1 through protective substrate PL1 of BD. The objective OL conducts focusing and tracking with biaxial actuator AC1 arranged on the periphery of the objective OL. Incidentally, detailed explanation of the objective OL will be given later.

The reflected light flux modulated by information pits on the information recording surface RL1 is transmitted again through the objective OL, and then is reflected by lifting mirror ML, to become a converged light flux when it passes through collimating optical system CL. After that, it passes through third prism P3, second prism P2 and first prism P1 in this order, and then, is given astigmatism by sensor optical system SE, to be converged on a light-receiving surface of photodetector PD. Information recorded on BD can be read by using signals outputted from photodetector PD.

In the optical pickup apparatus PU, when conducting recording and/or reproducing of information for DVD, a position of the collimating optical system CL is adjusted in the optical axis direction by a uniaxial actuator AC2 so that a red laser light flux may emerge from the collimating optical system CL in a state of a parallel light flux, and then, the red semiconductor laser LD2 is caused to emit light. A divergent light flux emitted from the red semiconductor laser LD2 is reflected by the second prism P2 as its light path is drawn with broken lines in FIG. 7, and then, is transmitted through third prism P3, to be converted into a parallel light flux by the collimator optical system CL. After that, the parallel light flux is reflected by the lifting mirror ML, to become a spot formed by the objective OL on information recording surface RL2 through protective substrate PL2 of DVD. The objective OL conducts focusing and tracking with biaxial actuator AC1 arranged on the periphery of the objective OL.

The reflected light flux modulated by information pits on the information recording surface RL2 is transmitted again through the objective OL, and then is reflected by lifting mirror ML, to become a converged light flux when it passes through collimating optical system CL. After that, it passes through third prism P3, second prism P2 and first prism P1 in this order, and then, is given astigmatism by sensor optical system SE, to be converged on a light-receiving surface of photodetector PD. Information recorded on BD can be read by using signals outputted from photodetector DVD.

In the optical pickup apparatus PU, when conducting recording and/or reproducing of information for CD, a position of the collimating optical system CL is adjusted in the optical axis direction by a uniaxial actuator AC2 so that an infrared laser light flux may emerge from the collimating optical system CL in a state of a parallel light flux, and then, the infrared semiconductor laser LD3 is caused to emit light.

A divergent light flux emitted from the infrared semiconductor laser LD3 is reflected by the third prism P3 as its light path is drawn with one-dot chain lines in FIG. 7, and then, is converted into a parallel light flux by the collimator optical system CL. After that, the parallel light flux is reflected by the lifting mirror ML, to become a spot formed by the objective OL on information recording surface RL3 through protective substrate PL3 of CD. The objective OL conducts focusing and tracking with biaxial actuator AC1 arranged on the periphery of the objective OL.

The reflected light flux modulated by information pits on the information recording surface RL2 is transmitted again through the objective OL, and then is reflected by lifting mirror ML, to become a converged light flux when it passes through collimating optical system CL. After that, it passes through third prism P3, second prism P2 and first prism P1 in this order, and then, is given astigmatism by sensor optical system SE, to be converged on a light-receiving surface of photodetector PD. Information recorded on BD can be read by using signals outputted from photodetector CD.

In the optical pickup apparatus PU, spherical aberration in the case of using BD can be corrected, by driving-collimating optical system CL in the optical axis direction by uniaxial actuator AC2. The spherical aberration correcting mechanism of this kind can correct wavelength fluctuations caused by manufacturing errors of blue semiconductor laser LD1, refractive index changes and refractive index distribution of the objective caused by temperature changes, focus-jump between information recording layers of multi-player disc, and spherical aberration caused by thickness fluctuations and thickness distribution caused by manufacturing errors of protective substrate PL1. Incidentally, by using this spherical aberration correcting mechanism, spherical aberration in the case of using DVD or CD can be corrected.

Figure 8:
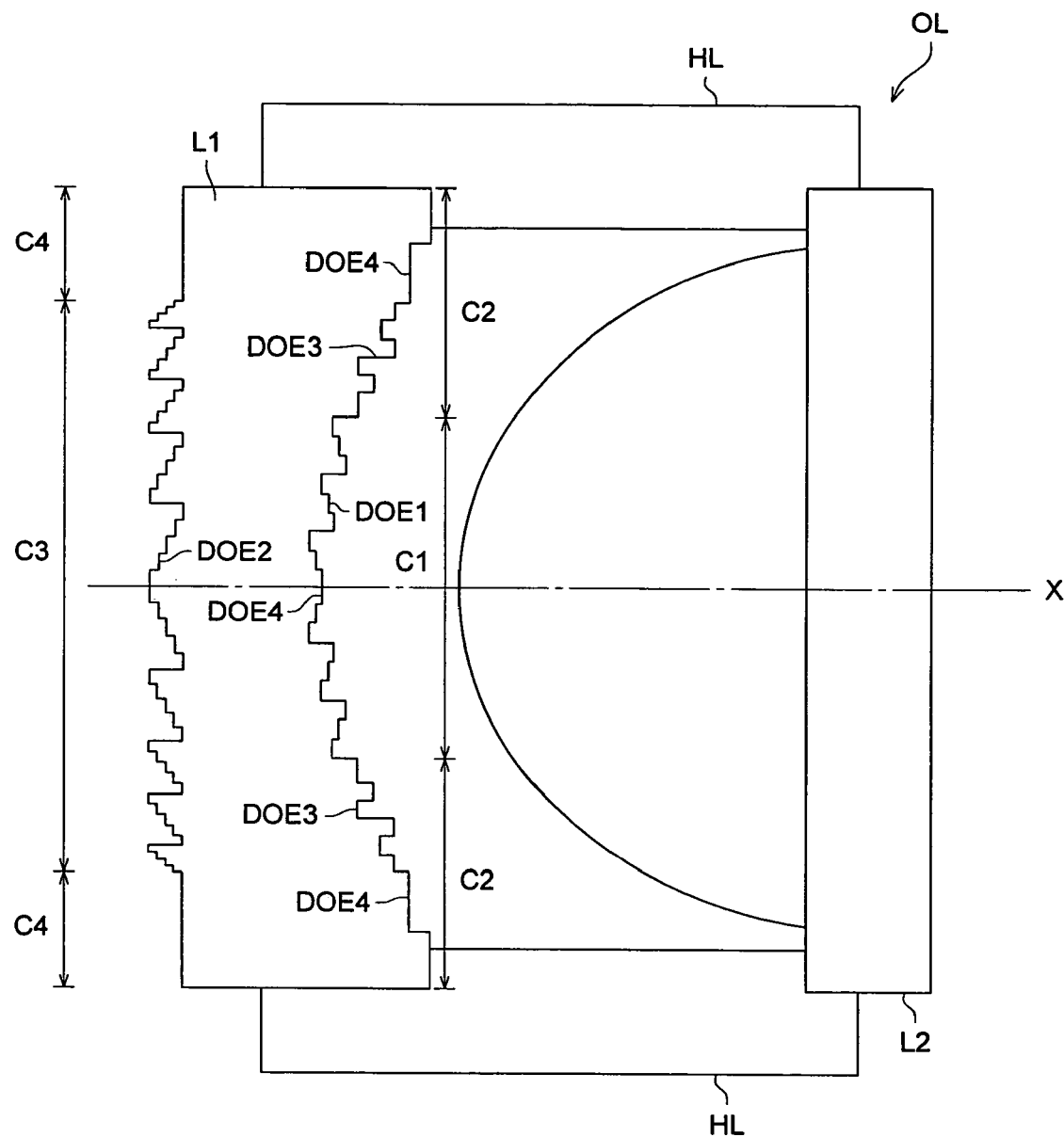
FIG. 8 is a drawing showing the structure of an objective according to certain embodiments.

Next, the structure of the objective will be explained. FIG. 8 shows schematically the structure of the objective OL of the invention. The objective OL has the structure wherein aberration correcting element L1 and light-convergence element L2 which are arranged in this order from the laser light source are held to be coaxial on optical axis X through lens-barrel (holding member) HL.

The aberration correcting element L1 is a plastic lens in which a stepwise diffractive structure and a phase structure are provided on a flat optical element, and its optical surface facing an optical information recording medium is divided into central area C1 corresponding to the inside of numerical aperture NA3 and peripheral area C2 that has numerical aperture NA3 or more and corresponds to the inside of numerical aperture NA1, while, an optical surface facing the laser light source is divided into central area C3 corresponding to the inside of numerical aperture NA2 and peripheral area C4 that has numerical aperture NA2 or more and corresponds to the inside of numerical aperture NA1.

On the central area C1, there is formed first diffractive structure DOE1 for correcting spherical aberration caused by a thickness difference between protective substrate PL1 and protective substrate PL3, and on a part of the peripheral area C2, there is formed third diffractive structure DOE3 for separating a light-convergence spot of the third light flux having passed through the first diffractive structure DOE1 from flare components of the third light flux that has passed through an area outside numerical aperture NA3, on information recording surface RL3. Further, on the entire surface of the optical surface facing an optical information recording medium, there is formed phase structure DOE4 for restraining defocus errors generated when a wavelength is changed instantaneously in the blue laser light source in the case of using BD. In the structure of the present example, therefore, the phase structure is superposed on the first diffractive structure, and the phase structure is superposed on the third diffractive structure.

Further, on the central area C3 on the optical surface facing the laser light source, there is formed second diffractive structure DOE2 for correcting spherical aberration caused by a thickness difference between protective substrate PL1 and protective substrate PL2, and the peripheral area C4 is a flat surface on which no microscopic structure such as a diffractive structure or a phase structure is formed. Therefore, the present example is of the structure wherein the first diffractive structure is superposed on the second diffractive structure when the objective is viewed in the optical axis direction.

A cross-sectional form including an optical axis of the first diffractive structure DOE1 is a stepwise form, and a depth of a step in the optical axis direction is 0.1.096 μm. Incidentally, blaze wavelength λB of the first diffractive structure DOE1 is 550 nm. In the case of this first diffractive structure DOE1, the diffraction order that makes the diffraction efficiency to be the maximum is a primary order for all light fluxes, and the diffraction efficiency of the primary diffracted light for each light flux is 58.2% for the blue laser light flux, 91.0% for the red laser light flux, and 72.0% for the infrared laser light flux. A pitch of ring-shaped zones of the first diffractive structure DOE1 is optimized so that spherical aberration caused by a thickness difference between protective substrate PL1 and protective substrate PL3 may be corrected properly.

Further, the second diffractive structure DOE2 is of the structure wherein patterns each having a stepwise sectional form including an optical axis are arranged to be in a form of concentric circles, and steps are shifted by a height equivalent to 4 steps for every 5 level surfaces, and one step in the pattern is established so that it may be twice the first wavelength λ1 in terms of an optical path difference, and depth d in the optical axis direction is 1.571 μm. This second diffractive structure DOE2 is a diffractive structure of a wavelength-selective type that diffracts only the second light flux as the first order diffracted light, and transmittance (transmittance of $0^{th}$ diffracted light) for the blue laser light flux is 100%, diffraction efficiency of the first order diffracted light for the red laser light flux is 87.2% and transmittance for the infrared laser light flux is 99.0%. A pitch of ring-shaped zones of the second diffractive structure DOE2 is optimized so that spherical aberration caused by a thickness difference between protective substrate PL1 and protective substrate PL2 may be corrected properly. The diffractive power of the second diffractive structure DOE2 is established to be positive, and its absolute value is determined so that the red laser light flux which has passed through the first and second diffractive structures DOE1 and DOE2 may be converged at the position that is sufficiently away from a light-converged position for flare component that has passed through an area outside numerical aperture NA2 (see FIG. 6), whereby, aperture restriction corresponding to numerical aperture NA2 is automatically carried out for the red laser light flux that has entered objective OL.

Now, a principle of diffraction by the second diffractive structure DOE2 will be explained. Since depth d of one step in the pattern in the optical axis direction is set to 1.571 μm, an optical path difference to be added by this step to the blue laser light flux is twice the first wavelength λ1 and an optical path difference to be added to an infrared laser light flux is the same as the third wavelength λ3, and the blue laser light flux and infrared laser light flux are transmitted without being subjected to diffracting actions. On the other hand, an optical path difference to be added by this step to the red laser light flux is about 1.2 times the second wavelength $\lambda 2$. Since the substantial optical path difference obtained by subtracting an optical path difference equivalent to one wavelength in the same phase is about 0.2 times the second wavelength $\lambda 2$, a wave front of the red laser light flux that has passed through adjoining level surfaces is deviated by a length equivalent to about 0.2 wavelength. Since an optical path for the total pattern composed of five level surfaces is about the same as the second wavelength $\lambda 2$ (0.2×5), a wave front that has passed adjoining patters is deviated by a length equivalent to one wavelength to be superposed, and it becomes diffracted light diffracted in the first order diffraction direction.

The third diffractive structure DOE3 is a two-step binary structure, and depth d of one step in the optical axis direction is 3.928 μm. This depth d is a depth equivalent to 5 times the first wavelength $\lambda 1$ in terms of an optical path difference, and it is also a depth equivalent to 3 times the second wavelength $\lambda 2$ in terms of an optical path difference. Therefore, the blue laser light flux and the red laser light flux are transmitted without being subjected to diffracting actions. On the other hand, the optical path difference added by this step to the infrared laser light flux is 2.5 times the third wavelength $\lambda 3$, and therefore, the third light flux thus entered is diffracted as ±first order diffracted light. Since a pitch of ring-shaped zones of the third diffractive structure is determined so that a light-convergence spot of the infrared laser light flux by the first diffractive structure. DOE1 may be separated properly from flare component of the third light flux having passed through the peripheral areas C2 and C4, on information recording surface RL3 (see FIGS. 3 and 4), whereby, aperture restriction corresponding to numerical aperture NA3 is automatically carried out for the infrared laser light flux that has entered objective OL.

A cross-sectional form of phase structure DOE4 including an optical axis is made to be stepwise, and depth d of a step in the optical axis direction is 7.857 μm. Meantime, blaze wavelength $\lambda B$ of phase structure DOE4 is 405 nm. This phase structure DOE4 is a diffractive structure wherein the diffraction order that makes diffraction efficiency to be the greatest is $10^{th}$ order for the blue laser light flux, $6^{th}$ order for the red laser light flux and $5^{th}$ order for the infrared laser light flux.

Since this phase structure DOE4 adds a phase difference in substantially the same amount to any one of light fluxes, the diffraction efficiency is almost 100% for any light flux. The phase structure DOE4 is of a structure to restrain chromatic aberration of objective OL, and even when mode-hopping is caused on blue laser light source LD1, defocus errors on information recording surface RL1 can be restrained small, thus, stable characteristics for recording and/or reproducing can be obtained constantly for BD.

Incidentally, an area percentage of central area C1 to the whole of an optical surface facing a laser is $\{(0.51/0.85)^2\}\times 100=36\%$. Therefore, diffraction efficiency for the blue laser light flux on the optical surface on the laser side is $\{0.582\times 0.36+1\times(1-0.36)\}\times 100=85.0\%$. Even in the case where much importance is attached to the diffraction efficiency of the first diffractive structure DOE1 for the infrared laser light flux, a diffraction efficiency average value within effective diameter of the blue laser light flux can be secured to be sufficiently high, because area percentage of the central area C1 to the effective diameter of the blue laser light flux is sufficiently small.

EXAMPLE 2

The second embodiment of the invention will be explained as follows, referring to the drawings. First, an optical pickup apparatus employing an objective representing another example of the invention will be explained, referring to FIG. 9.

Figure 9:
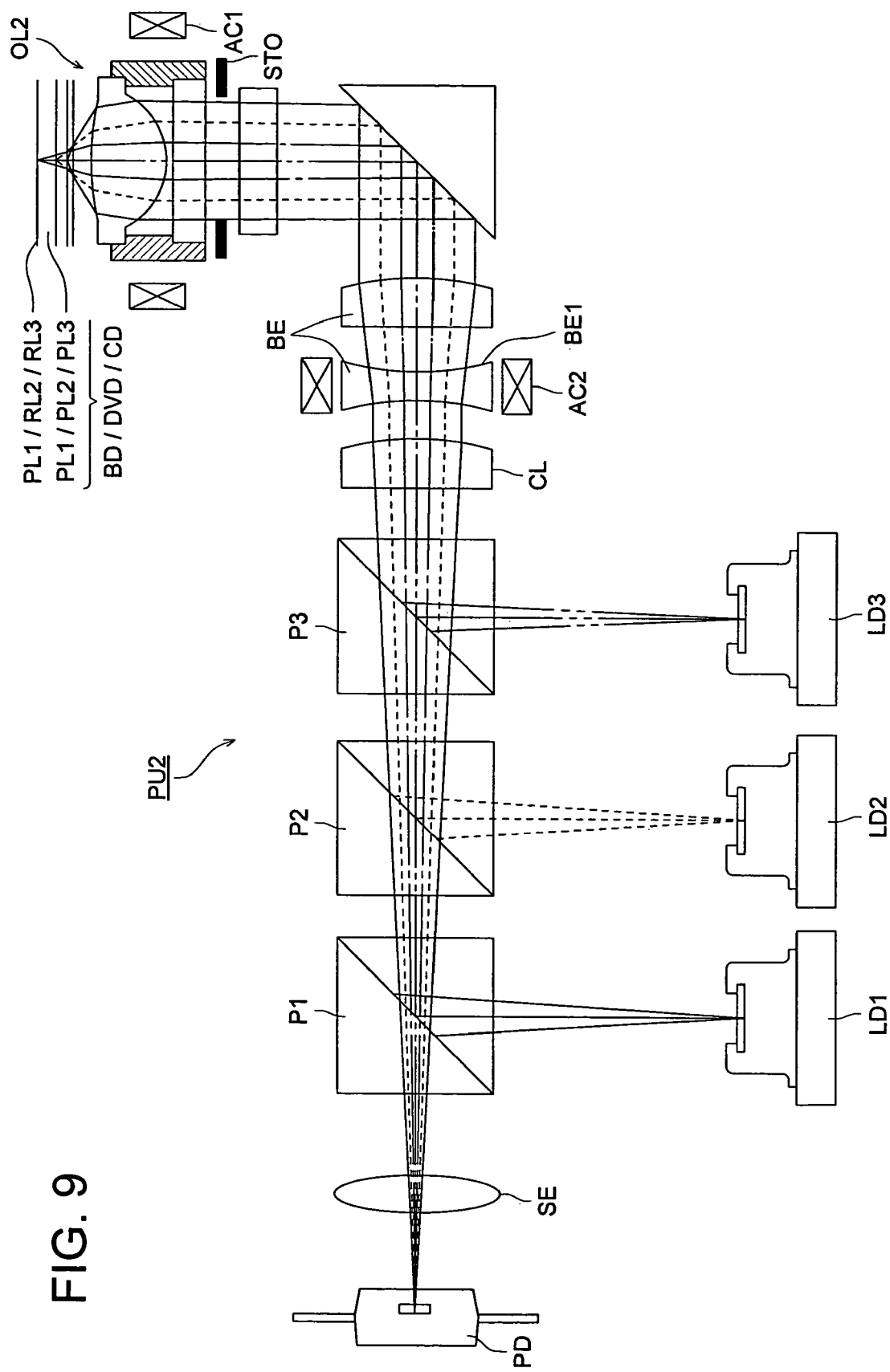
FIG. 9 is a plan view of primary portions showing the structure of an optical pickup apparatus according to certain embodiments.

In optical pickup apparatus PU2 shown schematically in FIG. 9, a point where the infrared laser light flux enters objective OL2 in the state of divergent light flux, a point that expander optical system BE having the structure to drive the first lens BE1 facing the laser light source in the optical axis direction with uniaxial actuator AC is used as a spherical aberration correcting mechanism and a point where weak divergent light flux enters the objective OL2 when conducting recording and/or reproducing of information for CD, are characterized.

The optical pickup apparatus PU is composed of blue semiconductor laser LD1 (first light source) for BD, red semiconductor laser LD2 (second light source) for DVD, infrared semiconductor laser LD3 (third light source) for CD, photodetector PD for common use for BD, DVD and CD, objective OL2, collimating optical system CL, expander optical system BE, biaxial actuator AC1, uniaxial actuator AC2, first prism P1, second prism P2, third prism P3, lifting mirror ML and of sensor optical system SE for adding astigmatism to reflected light flux coming from an information recording surface of each optical information recording medium. Meantime, as a light source for BD, blue SHG laser may also be used.

In the optical pickup apparatus PU2, when conducting recording and/or reproducing of information for BD, a position of the first lens BE is adjusted in the optical axis direction by uniaxial actuator AC2 so that a blue laser light flux may emerge from the expander optical system BE in a state of a parallel light flux, and then, the blue semiconductor laser LD1 is caused to emit light. A divergent light flux emitted from the blue semiconductor laser LD1 is reflected by the first prism P1 as its light path is drawn with solid lines in FIG. 9, and then, is transmitted through second prism P2 and third prism P3 in succession, to be converted into a parallel light flux by the collimator optical system CL. After that, the parallel light flux is converted by the expander optical system BE into a parallel light flux whose diameter is enlarged, and the parallel light flux is reflected by the lifting mirror ML, and is regulated by diaphragm STO in terms of a light flux diameter, to become a spot formed by the objective OL2 on information recording surface RL1 through protective substrate PL1 of BD. The objective OL2 conducts focusing and tracking with biaxial actuator AC1 arranged on the periphery of the objective OL2. Incidentally, detailed explanation of the objective OL2 will be given later.

The reflected light flux modulated by information pits on the information recording surface RL1 is transmitted again through the objective OL2, and then is reflected by lifting mirror ML, and is reduced in terms of its diameter by the expander optical system BE, to become a converged light flux when it passes through collimating optical system CL. After that, it passes through third prism P3, second prism P2 and first prism P1 in this order, and then, is given astigmatism by sensor optical system SE, to be converged on a light-receiving surface of photodetector PD. Information recorded on BD can be read by using signals outputted from photodetector PD.

In the optical pickup apparatus PU2, when conducting recording and/or reproducing of information for DVD, a position of the first lens BE is adjusted in the optical axis direction by a uniaxial actuator AC2 so that a red laser light flux may emerge from the expander optical system BE in a state of a parallel light flux, and then, the red semiconductor laser LD2 is caused to emit light. A divergent light flux emitted from the red semiconductor laser LD2 is reflected by the second prism P2 as its light path is drawn with broken lines in FIG. 9, and then, is transmitted through third prism P3, to be converted into an approximately parallel light flux by the collimator optical system CL. After that, the approximately parallel light flux is enlarged in terms of diameter by the expander optical system BE and is converted into a parallel light flux, and is reflected by the lifting mirror ML, to become a spot formed by the objective OL2 on information recording surface RL2 through protective substrate PL2 of DVD. The objective OL2 conducts focusing and tracking with biaxial actuator AC1 arranged on the periphery of the objective OL2.

The reflected light flux modulated by information pits on the information recording surface RL2 is transmitted again through the objective OL2, and then is reflected by lifting mirror ML, and is reduced in terms of its diameter by the expander optical system BE, to become a converged light flux when it passes through collimating optical system CL. After that, it passes through third prism P3, second prism P2 and first prism P1 in this order, and then, is given astigmatism by sensor optical system SE, to be converged on a light-receiving surface of photodetector PD. Information recorded on DVD can be read by using signals outputted from photodetector PD.

In the optical pickup apparatus PU2, when conducting recording and/or reproducing of information for CD, a position of the first lens BE1 is adjusted in the optical axis direction by a uniaxial actuator AC2 so that an infrared laser light flux may emerge from the expander BE in a state of a slightly divergent light flux, and then, the infrared semiconductor laser LD3 is caused to emit light. A divergent light flux emitted from the infrared semiconductor laser LD3 is reflected by the third prism P3 as its light path is drawn with one-dot chain lines in FIG. 9, and then, is converted into a mostly parallel light flux by the collimator optical system CL. After that, it is enlarged in terms of diameter by the expander optical system BE and is converted into a slightly divergent light flux, and then, is reflected by the lifting mirror ML, to become a spot formed by the objective OL2 on information recording surface RL3 through protective substrate PL3 of CD. The objective OL2 conducts focusing and tracking with biaxial actuator AC1 arranged on the periphery of the objective OL2.

The reflected light flux modulated by information pits on the information recording surface RL2 is transmitted again through the objective OL2, and then is reflected by lifting mirror ML, and is reduced in terms of its diameter by the expander optical system BE, to become a converged light flux when it passes through collimating optical system CL. After that, it passes through third prism P3, second prism P2 and first prism P1 in this order, and then, is given astigmatism by sensor optical system SE, to be converged on a light-receiving surface of photodetector PD. Information recorded on BD can be read by using signals outputted from photodetector CD.

In the optical pickup apparatus PU2, spherical aberration in the case of using BD can be corrected, by driving the first lens BE of the expander optical system BE in the optical axis direction by uniaxial actuator AC2. The spherical aberration correcting mechanism of this kind can correct wavelength fluctuations caused by manufacturing errors of blue semiconductor laser LD1, refractive index changes and refractive index distribution of the objective caused by temperature changes, focus-jump between information recording layers of multilayer disc, and spherical aberration caused by thickness fluctuations and thickness distribution caused by manufacturing errors of protective substrate PL1. Incidentally, by using this spherical aberration correcting mechanism, spherical aberration in the case of using DVD or CD can be corrected.

Figure 10:
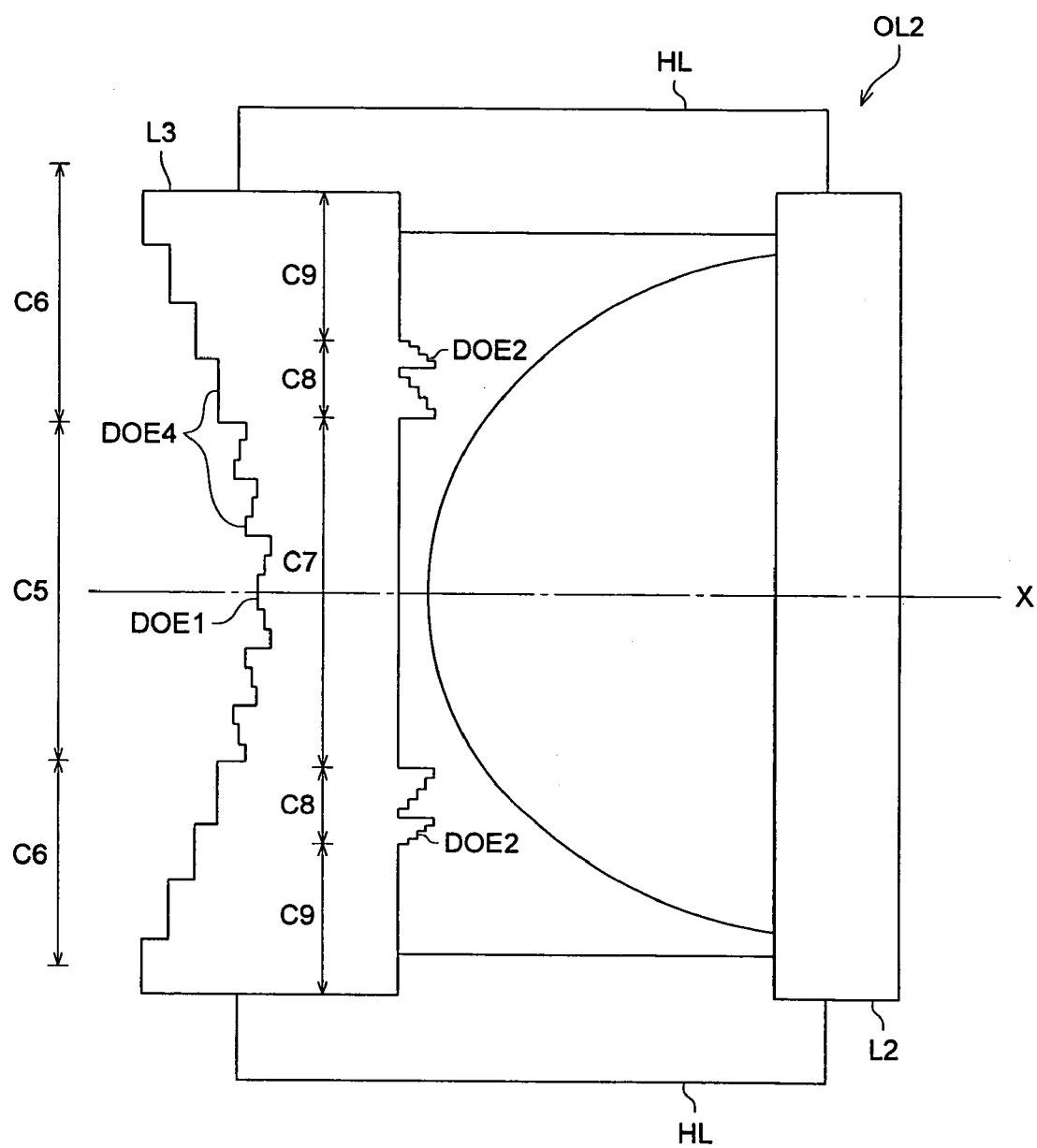
FIG. 10 is a drawing showing the structure of an objective according to certain embodiments.

Next, a structure of the objective OL2 will be explained. The objective OL2 shown schematically in FIG. 10 is characterized in that the second diffractive structure DOE2 is formed only on an area corresponding to numerical aperture NA3 or more and to the inside of numerical aperture NA2, on an optical surface facing an optical information recording medium.

An optical surface facing a laser light source on aberration correcting element L1 representing a flat optical element is divided into central area C5 corresponding to the inside of numerical aperture NA3 and peripheral area C6 corresponding to numerical aperture NA3 or more and to the inside of numerical aperture NA1, and an optical surface facing an optical information recording medium is divided into central area C7 corresponding to the inside of numerical aperture NA3, peripheral area C8 corresponding to numerical aperture NA3 or more and to the inside of numerical aperture NA2 and peripheral area C9 corresponding to numerical aperture NA2 or more and to the inside of numerical aperture NA1.

On the central area C5 on an optical surface facing the laser light source, there is formed first diffractive structure DOE1 for correcting spherical aberration caused by a thickness difference for protective substrate PL1, protective substrate PL2 and protective substrate PL3, and on the whole of an optical surface facing the laser light source, there is formed phase structure DOE4 for restraining defocus error generated when a wavelength is changed instantaneously in the blue laser light source in the case of using BD.

Further, on peripheral area C8 on an optical surface facing an optical information recording medium, there is formed the second diffractive structure DOE2 for correcting spherical aberration caused by thickness difference between protective substrate PL1 and protective substrate PL2.

A pitch of ring-shaped zones of the first diffractive structure DOE1 is optimized so that spherical aberration caused by a thickness difference between protective substrate PL1 and protective substrate PL2 may be corrected properly. Since the first diffractive structure DOE1 is optimized so that spherical aberration caused by a thickness difference between protective substrate PL1 and protective substrate PL2 may be corrected properly as stated above, when the infrared laser light flux enters the first diffractive structure DOE1 under the state of a parallel light flux, spherical aberration of the infrared laser light source is corrected insufficiently, and spherical aberration caused by a thickness difference between protective substrate PL1 and protective substrate PL3 remains on the information recording surface RL3. Therefore, when conducting recording and/or reproducing of information for CD, the infrared laser light source is made to enter the objective OL2 under the state of slightly divergent light flux, whereby, spherical aberration caused by a thickness difference between the protective substrate PL1 and the protective substrate PL3 is corrected completely.

A pitch of ring-shaped zones of the second diffractive structure DOE2 is optimized so that spherical aberration caused by a thickness difference between protective substrate PL1 and protective substrate PL2 may be corrected for the red laser light flux passing through peripheral area C8 on an optical surface facing the laser light source.

With respect to the phase structure DOE4, its functions and compositions are the same as those of the objective OL and of the diffractive structure DOE4 in the first embodiment, and therefore, detailed explanation thereof will be omitted here.

Figure 2:
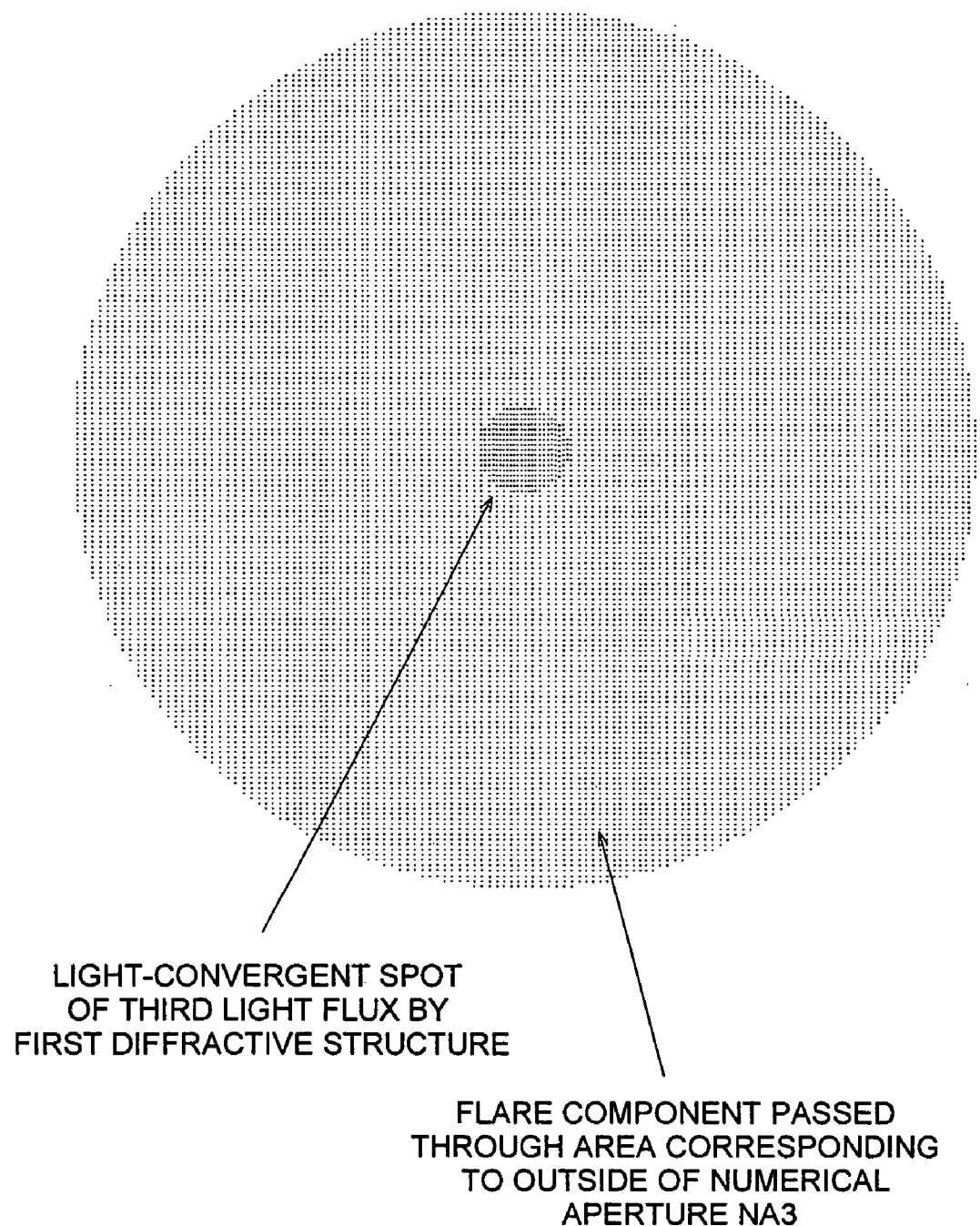
FIG. 2 is a spot diagram on an information recording surface of the third optical information recording medium according to certain embodiments.
Figure 5:
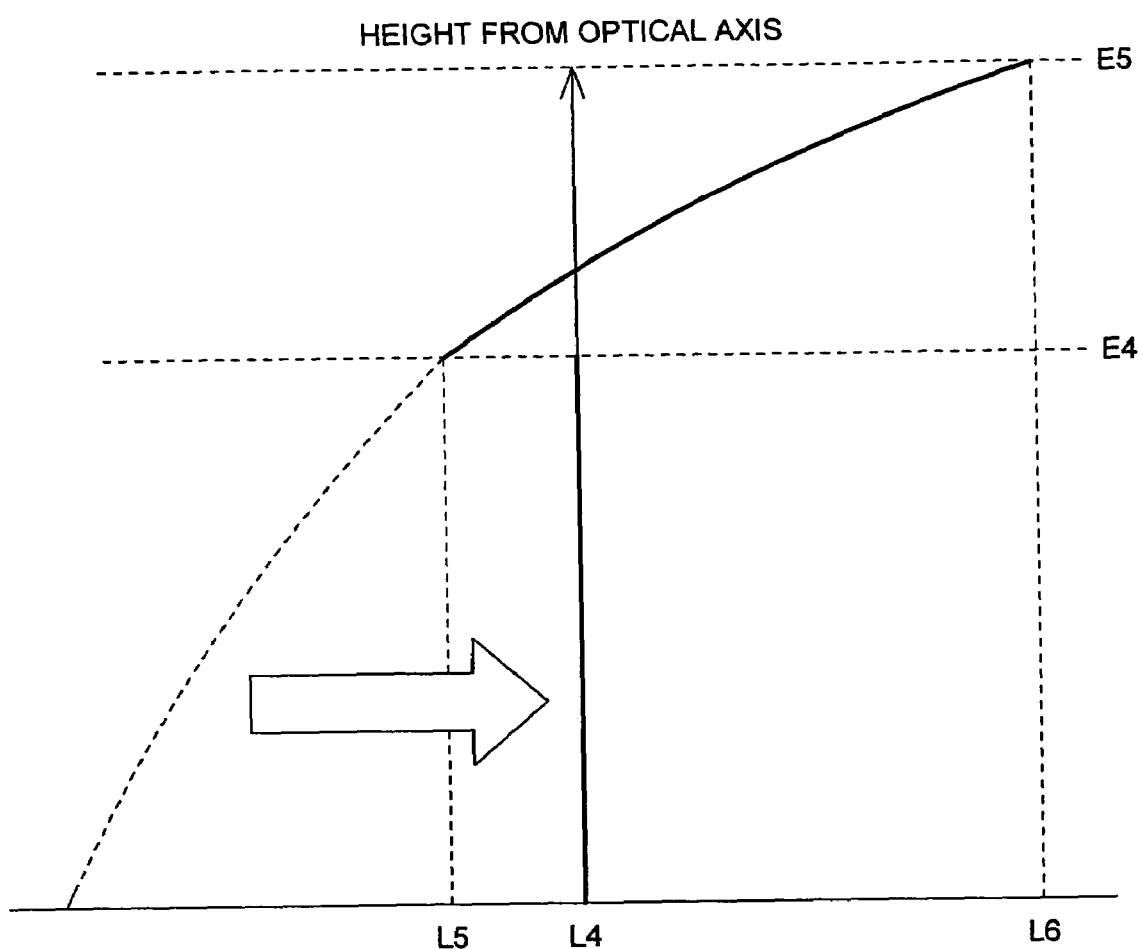
FIG. 5 is a vertical spherical aberration diagram of the second wavelength $\lambda 2$ according to certain embodiments.
Figure 11:
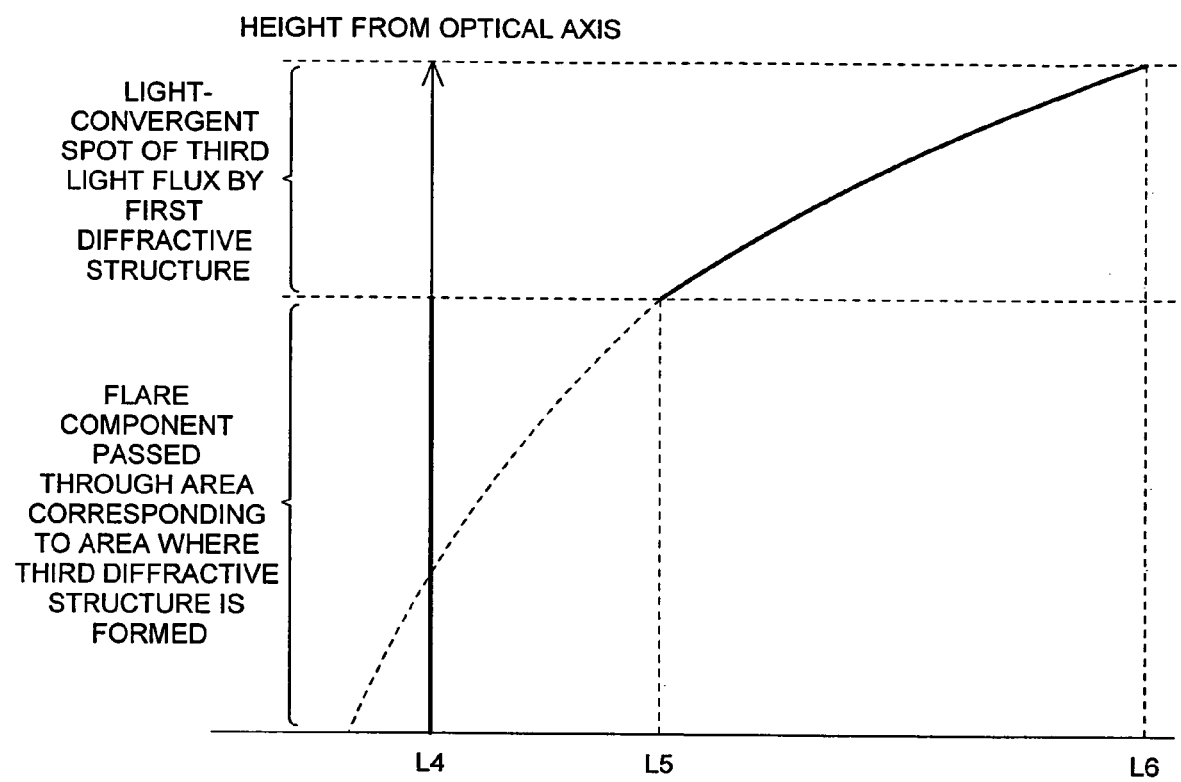
FIG. 11 is a vertical spherical aberration diagram of a red laser light flux according to certain embodiments.
Figure 12:
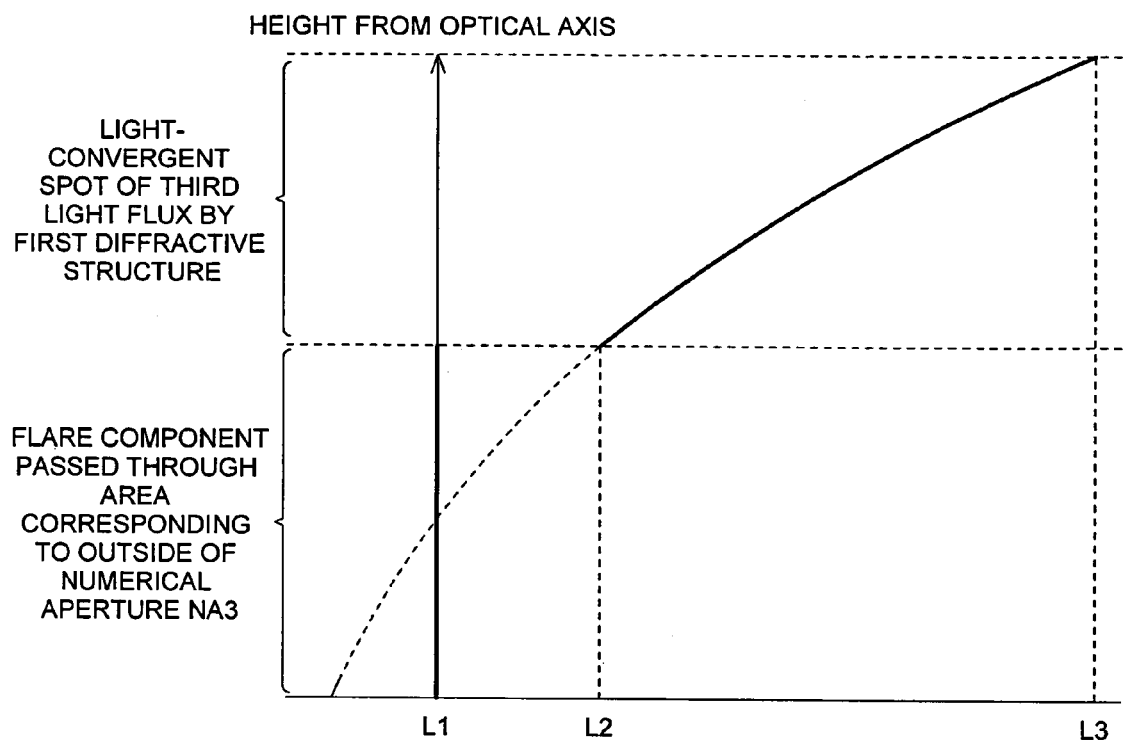
FIG. 12 is a vertical spherical aberration diagram of an infrared laser light flux according to certain embodiments.

Incidentally, though diffractive power of the first diffractive structure DOE1 is made to be negative, if an absolute value thereof is made to be too large, flare components passing through an area outside an effective diameter of each of the red laser light flux and the infrared light flux are superposed on a light-convergence spot as shown in a vertical spherical aberration diagram in FIG. 1 and FIG. 5, resulting in a fear that excellent characteristics for recording and reproducing cannot be obtained. In the present objective OL2, therefore, an absolute value of diffractive power was determined so that the light-convergence spot and flare components passing through an area outside an effective diameter may not be superposed each other (see FIGS. 11 and 12) Owing to this, an aperture restriction corresponding to respective numerical apertures is conducted automatically for the red laser light flux and the infrared laser light flux entering the objective OL2.

Incidentally, though the structure to arrange three laser light sources independently is employed in the first embodiment and the second embodiment stated above, it is also possible to use a laser light source wherein three laser light sources are contained in one casing, or a laser light source wherein three laser emission points are formed on the same chip. Further, though the aforesaid optical pickup apparatuses PU and PU2 employ the structure wherein a laser light source and photodetector PD are arranged independently, it is also possible to use an element wherein a laser light source and a photodetector are united solidly. It is further possible for the optical pickup apparatuses PU and PU2 to use a phase control element employing a liquid crystal as a spherical aberration correcting mechanism. Since a method to correct spherical aberration by the phase control element of this kind is widely known, the detail explanation therefor will be omitted here.

In the aforesaid embodiments, an objective and an optical pickup apparatus both capable of conducting recording and/or reproducing for three types of optical discs including high density optical information recording medium BD, DVD and CD were exemplified. However, it is easily understood that the invention can be applied to an objective, an optical pickup apparatus and an optical information recording and/or reproducing apparatus all capable of conducting recording and/or reproducing for two types of optical discs including high density optical information recording medium BD and DVD, or for two types of optical discs including high density optical information recording medium BD and CD.

For example, it is possible to construct by keeping an objective that is necessary for conducting recording and/or reproducing for two types of optical discs and by eliminating other optical elements, and thereby, it is possible to realize optical pickup optical systems and optical pickup apparatuses wherein downsizing, weight reduction, cost reduction and structure simplification are realized.

It is further possible to apply HD and other high density optical discs in place of BD.

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An objective for use in an optical pickup apparatus which conducts reproducing and/or recording information for a first optical information recording medium comprising a first protective substrate whose thickness is t1 by using a first light flux having a wavelength $\lambda 1$ emitted from a first light source, conducts reproducing and/or recording information for a second optical information recording medium comprising a second protective substrate whose thickness is t2 (t1<=t2) by using a second light flux having a wavelength $\lambda 2$ ($1.5 \cdot \lambda 1 < \lambda 2 < 1.7 \cdot \lambda 1$) emitted from a second light source, and conducts reproducing and/or recording information for a third optical information recording medium comprising a third protective substrate whose thickness is t3 (t2<t3) by using a third light flux having a wavelength: $\lambda 3$ ($1.9 \cdot \lambda 1 < \lambda 3 < 2.1 \cdot \lambda 1$) emitted from a third light source, the objective comprising:

a first diffractive structure, and a second diffractive structure, wherein the first diffractive structure makes a light amount of p-th ordered diffracted ray (p is an integer except 0) of the first light flux larger than a light amount of any other ordered diffracted ray of the first light flux, makes a light amount of p-th ordered diffracted ray of the second light flux larger than a light amount of any other ordered diffracted ray of the second light flux, and makes a light amount of p-th ordered diffracted ray of the third light flux larger than a light amount of any other ordered diffracted ray of the third light flux, and wherein the second diffractive structure makes a light amount of 0-th ordered diffracted ray of the first light flux larger than a light amount of any other ordered diffracted ray of the first light flux, makes a light amount of q-th ordered diffracted ray (q is an integer except 0 and p=q or p≠q) of the second light flux larger than a light amount of any other ordered diffracted ray of the second light flux, and makes a light amount of 0-th ordered diffracted ray of the third light flux larger than a light amount of any other ordered diffracted ray of the third light flux.

2. The objective of claim 1, wherein the p is 1.

3. The objective of claim 1, wherein the q is 1.

4. The objective of claim 2, wherein the following formula is satisfied:

$\lambda 1 < \lambda B < \lambda 3$ where $\lambda B$ represents a blaze wavelength of the first diffractive structure.

5. The objective of claim 4, wherein the following formulas are satisfied:

$1.25 \cdot \lambda 1 < \lambda B < 0.95 \cdot \lambda 2,$ $NA1 > NA3,$ $NA3/NA1 < 0.7$ where NA1 represents a numerical aperture of the objective necessary for reproducing and/or recording information for the first optical information recording medium with the use of the first light flux, NA3 represents a numerical aperture of the objective necessary for reproducing and/or recording information for the third optical information recording medium with the use of the third light flux.

6. The objective of claim 1, wherein a diffractive power of the first diffractive structure is negative.

7. The objective of claim 1, wherein a sectional shape of the first diffractive structure at a plane including an optical axis is stepwise.

8. The objective of claim 1, wherein the second diffractive structure is of a structure in which patterns whose sectional form at a plane including an optical axis is stepwise form are arranged to be in a form of concentric circles, and steps are shifted by a height equivalent to the number of steps corresponding to the number of level surfaces for a prescribed number of level surfaces, and wherein the following formula is satisfied:

$$y \cdot 0.95 \cdot \lambda 1 \leq d_b \leq y \cdot 1.05 \cdot \lambda 1$$

where y represents an optional even number, $d_b$ represents an optical path difference to be added by a step between adjoining level surfaces in the one pattern to the first light flux.

9. The objective of claim 8, wherein the number of level surfaces is any of 4, 5 and 6, and wherein the following formula is satisfied:

$$y=2$$

10. The objective of claim 1, wherein the objective further comprises a third diffractive structure, wherein the third diffractive structure makes a light amount of 0-th ordered diffracted ray of the first light flux larger than a light amount of any other ordered diffracted ray of the first light-flux, makes a light amount of 0-th ordered diffracted ray of the second light flux larger than a light amount of any other ordered diffracted ray of the second light flux, and makes a light amount of r-th ordered diffracted ray (r is an integer except 0 and r=p or r≠p) of the third light flux larger than a light amount of any other ordered diffracted ray of the third light flux.

11. The objective of claim 10, wherein the following formulas are satisfied:

$$NA1 > NA3,$$

where NA1 represents a numerical aperture of the objective necessary for reproducing and/or recording information for the first optical information recording medium with the use of the first light flux, NA3 represents a numerical aperture of the objective necessary for reproducing and/or recording information for the third optical information recording medium with the use of the third light flux, and wherein the first diffractive structure is formed on an area corresponding to the inside of NA3, and wherein the third diffractive structure is formed on an area corresponding to the outside of NA3.

12. The objective of claim 10, wherein the third diffractive structure is a two-step binary structure, and wherein the following formula is satisfied:

$$4.8 \cdot \lambda 1 \leq d_c \leq 5.2 \cdot \lambda 1$$

where $d_c$ represents an optical path difference to be added by one step of the binary structure to the first light flux.

13. The objective of claim 1, wherein the following formula is satisfied:

$$NA2 > NA3,$$

where NA2 represents a numerical aperture of the objective necessary for reproducing and/or recording information for the second optical information recording medium with the use of the second light flux, NA3 represents a numerical aperture of the objective necessary for reproducing and/or recording information for the third optical information recording medium with the use of the third light flux, and wherein the first diffractive structure is formed on an area corresponding to the inside of NA3, and wherein the second diffractive structure is formed on an area corresponding to the inside of NA2.

14. The objective of claim 13, wherein the second diffractive structure is formed on an area corresponding to the outside of NA3.

15. The objective of claim 1, wherein NA2 represents a numerical aperture of the objective necessary for reproducing and/or recording information for the second optical information recording medium with the use of the second light flux, and wherein the second diffractive structure is formed on the entire surface of an area corresponding to the inside of NA2, and wherein the diffractive power of the second diffractive structure is positive.

16. The objective of claim 1, wherein the objective further comprises a phase structure, and wherein the following formulas are satisfied:

$$a \cdot 0.95 \cdot \lambda 1 <= d_1 \leq = a \cdot 1.05 \cdot \lambda 1,$$

$$b \cdot 0.95 \cdot \lambda 2 <= d_2 <= b \cdot 1.05 \cdot \lambda 2,$$

$$c \cdot 0.95 \cdot \lambda 3 <= d_3 <= c \cdot 1.05 \cdot \lambda 3,$$

$$0.9 \cdot d_1 <= d_2 <= 1.1 \cdot d_1,$$

$$0.9 \cdot d_1 <= d_3 <= 1.1 \cdot d_1,$$

where a represents an optional positive integer, b represents an optional positive integer smaller than a, c represents an optional positive integer smaller than b, $d_1$ represents an optical path difference of the first light flux generated by one step of the phase structure, $d_2$ represents an optical path difference of the second light flux generated by one step of the phase structure and $d_3$ represents an optical path difference of the third light flux generated by one step of the phase structure.

17. The objective of claim 16, wherein the following formulas are satisfied:

$$a=10,$$

$$b=6,$$

$$c=5,$$

$$350 \text{ [nm]} <= \lambda 1 <= 440 \text{ [nm]},$$

$$570 \text{ [nm]} <= \lambda 2 <= 670 \text{ [nm]},$$

$$750 \text{ [nm]} <= \lambda 3 <= 880 \text{ [nm]}.$$

18. The objective of claim 16, wherein the first diffractive structure and the phase structure are provided on a same optical surface of the objective, and wherein the prescribed number of ring-shaped zones of the first diffractive structure are formed within one ring-shaped zone of the phase structure.

19. The objective of claim 18, wherein the phase structure makes a light amount of s-th ordered diffracted ray (s is an integer except 0) of the first light flux larger than a light amount of any other ordered diffracted ray of the first light flux, makes a light amount of t-th ordered diffracted ray (t is an integer which is different from s and not 0) of the second light flux larger than a light amount of any other ordered diffracted ray of the second light flux, and makes a light amount of u-th ordered diffracted ray (u is an integer which is different from s and t and not 0) of the third light flux larger than a light amount of any other ordered diffracted ray of the third light flux, and wherein the following formula is satisfied:

$$|(d_a/p)|/|(d_1/s)|=m$$

where m represents a positive integer, and $d_a$ represents an optical path difference to be added by the first diffractive structure to the first light flux.

20. The objective of claim 16, wherein a sectional shape of the phase structure at a plane including an optical axis is stepwise.

21. The objective of claim 10, wherein the first diffractive structure and the third diffractive structure are provided on a same optical surface of the objective.

22. The objective of claim 21, wherein the first diffractive structure and the third diffractive structure are overlapped.

23. The objective of claim 10, wherein the second diffractive structure and the third diffractive structure are provided on a same optical surface of the objective.

24. The objective of claim 23, wherein the second diffractive structure and the third diffractive structure are overlapped.

25. The objective of claim 1, wherein the first diffractive structure and the second diffractive structure are provided on different optical surfaces of the objective.

26. The objective of claim 25, wherein the first diffractive structure and the second diffractive structure are overlapped when the objective is viewed in the direction of an optical axis of the objective.

27. The objective of claim 25, wherein the first diffractive structure and the second diffractive structure are not overlapped when the objective is viewed in the direction of an optical axis of the objective.

28. The objective of claim 1, wherein the objective comprises a lens and a flat optical element, and wherein the flat optical element comprises the first diffractive surface and the second diffractive surface.

29. The objective of claim 10, wherein the objective comprises a lens and a flat optical, element, and
wherein the flat optical element comprises the first diffractive structure, the second diffractive structure and the third diffractive structure.

30. The objective of claim 16, wherein the objective comprises a lens and a flat optical element, and
wherein the flat optical element comprises the first diffractive structure, the second diffractive structure and the phase structure.

31. The objective of claim 1, wherein the objective comprising a structure in which a form in which patterns whose sectional form at a plane including an optical axis is made to be a larger stepwise form are arranged to be in a form of concentric circles is superposed on a form in which patterns whose sectional form at a plane including an optical axis is made to be a smaller stepwise form are arranged to be in a form of concentric circles within one step of the larger stepwise form.

32. The objective of claim 31, wherein the pattern with the larger stepwise form is of a structure in which a lager step goes down in the direction toward the inside of the objective in the optical axis direction as a position of the larger step approaches the optical axis in the direction perpendicular to the optical axis, and wherein the pattern with the smaller stepwise form is of a structure in which a smaller step goes up in the direction toward the outside of the objective in the optical axis direction as a position of the smaller step approaches the optical axis in the direction perpendicular to the optical axis.

33. The objective of claim 31, wherein the following formulas are satisfied:

$$0.9 < dp \cdot (n-1)/\lambda 1 < 1.5$$

$$9.8 < DP \cdot (nz-1)/\lambda 1 < 10.2$$

where dp represents a depth of a smaller step of the pattern with the smaller stepwise form, DP represents a depth of a larger step of the pattern with the larger stepwise form, and n represents a refractive index of an optical material of the objective on which the pattern of the larger and smaller stepwise forms is provided, for the first light flux.

34. The objective of claim 33, wherein the following formula is satisfied:

$$1.9 < dp_2 \cdot (n_x-1)/\lambda 1 < 2.1$$

where $dp_2$ represents a depth of a step of the second diffractive structure and $n_x$ represents a refractive index of an optical material of the objective on which the second diffractive structure is provided for the first light flux.

35. An optical pickup apparatus for recording and/or reproducing information for an optical information recording medium, comprising:
a first light source to emit a first light flux having a wavelength λ1 for recording and/or reproducing a first optical information recording medium comprising a first protective substrate whose thickness is t1;
a second light source to emit a second light flux having a wavelength λ2 (1.5·λ1<λ2<1.7·λ1) for recording and/or reproducing a second optical information recording medium comprising a second protective substrate whose thickness is t2 (t1<=t2);
a third light source to emit a third light flux having a wavelength λ3 (1.9·λ1<λ3<2.1·λ1) for recording and/or reproducing a third optical information recording medium comprising a third protective substrate whose thickness is t3 (t2<t3);
an objective to converge the first light flux emitted from the first light source onto an information recording plane of the first optical information recording medium when recording and/or reproducing information is conducted for the first optical information recording medium, to converge the second light flux emitted from the second light source onto an information recording plane of the second optical information recording medium when recording and/or reproducing information is conducted for the second optical information recording medium, and to converge the third light flux emitted from the third light source onto an information recording plane of the third optical information recording medium when recording and/or reproducing information is conducted for the third optical information recording medium; and
wherein the objective comprises:
a first diffractive structure, and
a second diffractive structure, and
wherein the first diffractive structure makes a light amount of p-th ordered diffracted ray (p is an integer except 0) of the first light flux larger than a light amount of any other ordered diffracted ray of the first light flux, makes a light amount of p-th ordered diffracted ray of the second light flux larger than a light amount of any other ordered diffracted ray of the second light flux, and makes a light amount of p-th ordered diffracted ray of the third light flux larger than a light amount of any other ordered diffracted ray of the third light flux, and wherein the second diffractive structure makes a light amount of 0-th ordered diffracted ray of the first light flux larger than a light amount of any other ordered diffracted ray of the first light flux, makes a light amount of q-th ordered diffracted ray (q is an integer except 0 and p=q or p≠q) of the second light flux larger than a light amount of any other ordered diffracted ray of the second light flux, and makes a light amount of 0-th ordered diffracted ray of the third light flux larger than a light amount of any other ordered diffracted ray of the third light flux.

36. An optical information recording and/or reproducing apparatus, comprising:

an optical pickup apparatus for recording and/or reproducing information for an optical information recording medium, the optical pickup apparatus comprising:

a first light source to emit a first light flux having a wavelength $\lambda 1$ for recording and/or reproducing a first optical information recording medium comprising a first protective substrate whose thickness is t1;

a second light source to emit a second light flux having a wavelength $\lambda 2$ ($1.5 \cdot \lambda 1 < \lambda 2 < 1.7 \cdot \lambda 1$) for recording and/or reproducing a second optical information recording medium comprising a second protective substrate whose thickness is t2 (t1<=t2);

a third light source to emit a third light flux having a wavelength $\lambda 3$ ($1.9 \cdot \lambda 1 < \lambda 3 < 2.1 \cdot \lambda 1$) for recording and/or reproducing a third optical information recording medium comprising a third protective substrate whose thickness is t3 (t2<t3);

an objective to converge the first light flux emitted from the first light source onto an information recording plane of the first optical information recording medium when recording and/or reproducing information is conducted for the first optical information recording medium, to converge the second light flux emitted from the second light source onto an information recording plane of the second optical information recording medium when recording and/or reproducing information is conducted for the second optical information recording medium, and to converge the third light flux emitted from the third light source onto an information recording plane of the third optical information recording medium when recording and/or reproducing information is conducted for the third optical information recording medium; and wherein the objective comprises:
a first diffractive structure, and
a second diffractive structure, and wherein the first diffractive structure makes a light amount of p-th ordered diffracted ray (p is an integer except 0) of the first light flux larger than a light amount of any other ordered diffracted ray of the first light flux, makes a light amount of p-th ordered diffracted ray of the second light flux larger than a light amount of any other ordered diffracted ray of the second light flux, and makes a light amount of p-th ordered diffracted ray of the third light flux larger than a light amount of any other ordered diffracted ray of the third light flux, and wherein the second diffractive structure makes a light amount of 0-th ordered diffracted ray of the first light flux larger than a light amount of any other ordered diffracted ray of the first light flux, makes a light amount of q-th ordered diffracted ray (q is an integer except 0 and p=q or p≠q) of the second light flux larger than a light amount of any other ordered diffracted ray of the second light flux, and makes a light amount of 0-th ordered diffracted ray of the third light flux larger than a light amount of any other ordered diffracted ray of the third light flux.

\* \* \* \* \*